US012432722B2

(12) United States Patent
Ren et al.

(10) Patent No.: US 12,432,722 B2
(45) Date of Patent: Sep. 30, 2025

(54) CSI-RS TO ENHANCE PDCCH TRANSMISSION OR RECEPTION

(71) Applicant: QUALCOMM Incorporated, San Diego, CA (US)

(72) Inventors: Yuwei Ren, Beijing (CN); Ruifeng Ma, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 17/793,020

(22) PCT Filed: Feb. 22, 2020

(86) PCT No.: PCT/CN2020/076295
§ 371 (c)(1),
(2) Date: Jul. 14, 2022

(87) PCT Pub. No.: WO2021/159553
PCT Pub. Date: Aug. 19, 2021

(65) Prior Publication Data
US 2023/0052478 A1  Feb. 16, 2023

(30) Foreign Application Priority Data
Feb. 14, 2020 (WO) ............... PCT/CN2020/075288

(51) Int. Cl.
*H04W 72/12* (2023.01)
*H04B 7/06* (2006.01)
(Continued)

(52) U.S. Cl.
CPC ...... *H04W 72/1273* (2013.01); *H04B 7/0626* (2013.01); *H04L 5/0051* (2013.01); *H04W 72/23* (2023.01)

(58) Field of Classification Search
CPC ............ H04W 72/1273; H04W 72/23; H04B 7/0626; H04L 5/0051; H04L 5/0048
See application file for complete search history.

(56) References Cited

U.S. PATENT DOCUMENTS 10,237,857 B2   3/2019  Islam et al.
10,454,541 B2  10/2019  Sundararajan et al.
(Continued)

FOREIGN PATENT DOCUMENTS

CN      102186251 A    9/2011
CN      102256358 A   11/2011
(Continued)

OTHER PUBLICATIONS

Huawei, et al., "CR to Add QCL Definition", 3GPP TSG-RAN4 Meeting #93, R4-1914911, (section 3.6) Nov. 22, 2019 (Nov. 22, 2019), 2 pages, the whole document.
(Continued)

*Primary Examiner* — Shukri Taha
(74) *Attorney, Agent, or Firm* — Paul M. McAdams; Polsinelli LLP

(57) ABSTRACT

Aspects are provided which enhance receiver performance of PDCCH by allowing a base station to associate a configured PDSCH CSI-RS with a PDCCH for channel estimation and reception by a UE. A UE receives a reference signal associated with a physical downlink shared channel (PDSCH) from a base station, and uses the reference signal to receive a physical downlink control channel (PDCCH) and/or measure the PDCCH and feedback a corresponding channel measurement for the PDCCH. A base station configures a reference signal associated with a PDSCH for transmission of a PDCCH and/or reception of a corresponding channel measurement for the PDCCH as feedback from the UE, and transmits the reference signal to the UE.

28 Claims, 12 Drawing Sheets

(51) Int. Cl.
  *H04L 5/00*   (2006.01)
  *H04W 72/1273*   (2023.01)
  *H04W 72/23*   (2023.01)

(56) References Cited

U.S. PATENT DOCUMENTS

| | | | |
|---|---|---|---|
| 2018/0262313 A1* | 9/2018 | Nam | ............ H04L 5/0044 |
| 2020/0045708 A1 | 2/2020 | Hwang et al. | |

FOREIGN PATENT DOCUMENTS

| | | |
|---|---|---|
| CN | 102918788 A | 2/2013 |
| CN | 105580467 A | 5/2016 |
| CN | 107659525 A | 2/2018 |
| WO | 2010105566 A1 | 9/2010 |
| WO | 2017184304 A1 | 10/2017 |
| WO | 2018031422 | 2/2018 |
| WO | WO-2018143721 A1 * | 8/2018 ........... H04B 7/0617 |
| WO | 2019095299 A1 | 5/2019 |
| WO | 2020029769 A1 | 2/2020 |

OTHER PUBLICATIONS

Intel Corporation: "Remaining Issues on Reference Signal and QCL", R1-1811647, 3GPP TSG RAN WG1 Meeting #94b, Oct. 12, 2018 (Oct. 12, 2018), 7 pages, the whole document.
International Search Report and Written Opinion—PCT/CN2020/075288—ISA/EPO—Nov. 18, 2020.
International Search Report and Written Opinion—PCT/CN2020/076295—ISA/EPO—Oct. 29, 2020.
Samsung: "R-PDCCH Multiplexing", 3GPP TSG RAN WG1 Meeting #61 RI-103041, Montreal, Canada, May 10-14, 2010, May 14, 2010 (May 14, 2010) The Whole Document, pp. 1-4.
Supplementary European Search Report—EP20918210—Search Authority—Munich—Apr. 11, 2024.

* cited by examiner

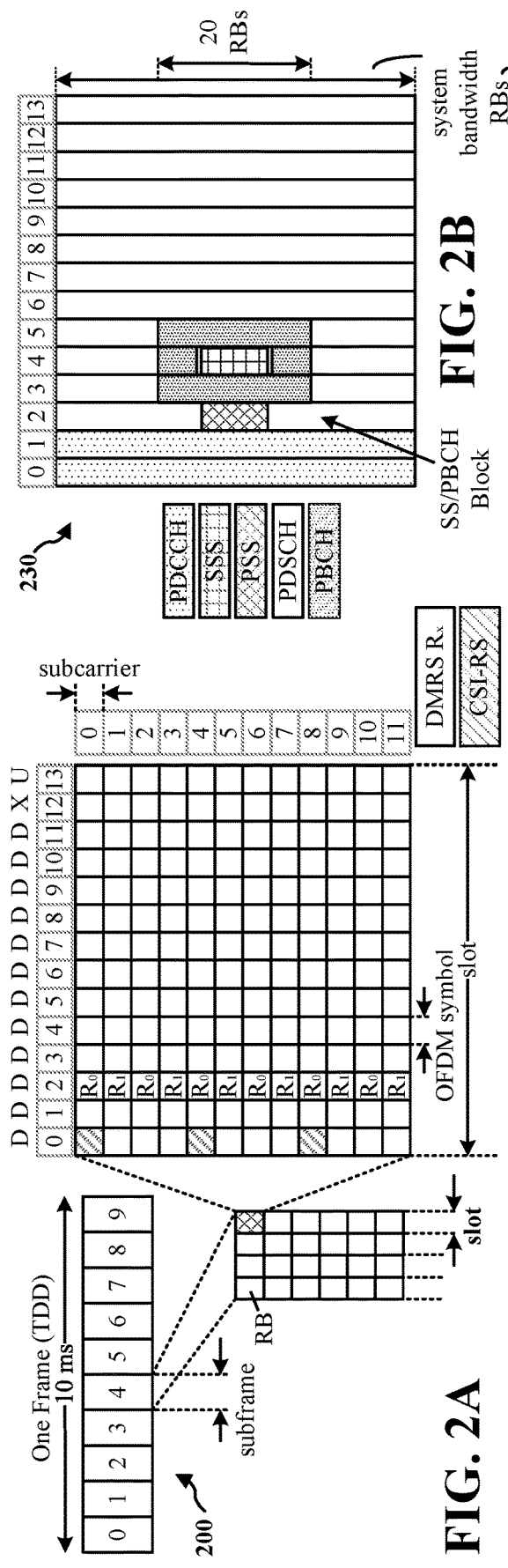
FIG. 2A
FIG. 2B
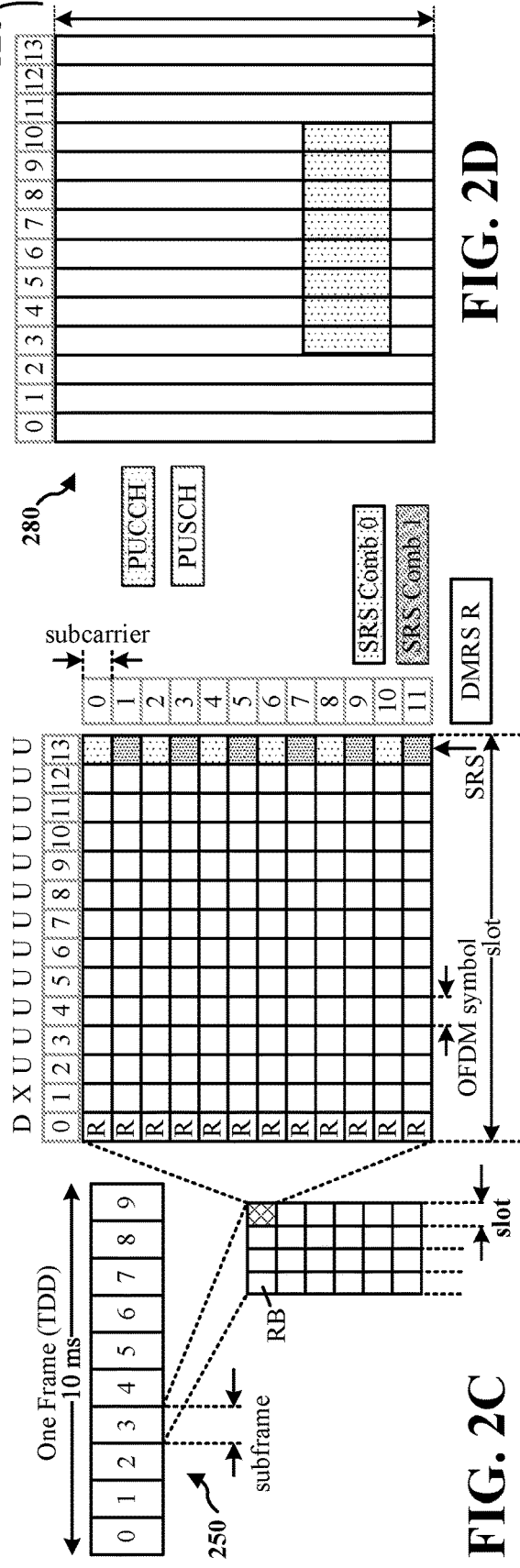
FIG. 2C
FIG. 2D

CSI-RS TO ENHANCE PDCCH TRANSMISSION OR RECEPTION

CROSS REFERENCE TO RELATED APPLICATION(S)

This application is National Stage Application filed under 35 U.S.C. § 371 of PCT International Application Serial No. PCT/CN2020/076295, entitled "CSI-RS TO ENHANCE PDCCH TRANSMISSION OR RECEPTION" and filed Feb. 22, 2020, which claims the benefit of International Application Serial No. PCT/CN2020/075288, entitled "CSI-RS TO ENHANCE PDCCH TRANSMISSION OR RECEPTION" and filed on Feb. 14, 2020, which are expressly incorporated by reference herein in their entirety.

BACKGROUND

Technical Field

The present disclosure relates generally to communication systems, and more particularly, to a wireless communication system between a user equipment (UE) and a base station including a downlink control channel.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus receives a reference signal associated with a physical downlink shared channel (PDSCH), and uses the reference signal to at least one of receive a physical downlink control channel (PDCCH), or measure the PDCCH and feedback a corresponding channel measurement for the PDCCH.

In another aspect of the disclosure, a method, a computer-readable medium, and an apparatus are provided. The apparatus may be a base station. The apparatus configures a reference signal associated with a PDSCH for at least one of transmission of a physical downlink control channel (PDCCH), or reception of a corresponding channel measurement for the PDCCH as feedback from a UE. The apparatus transmits the reference signal to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
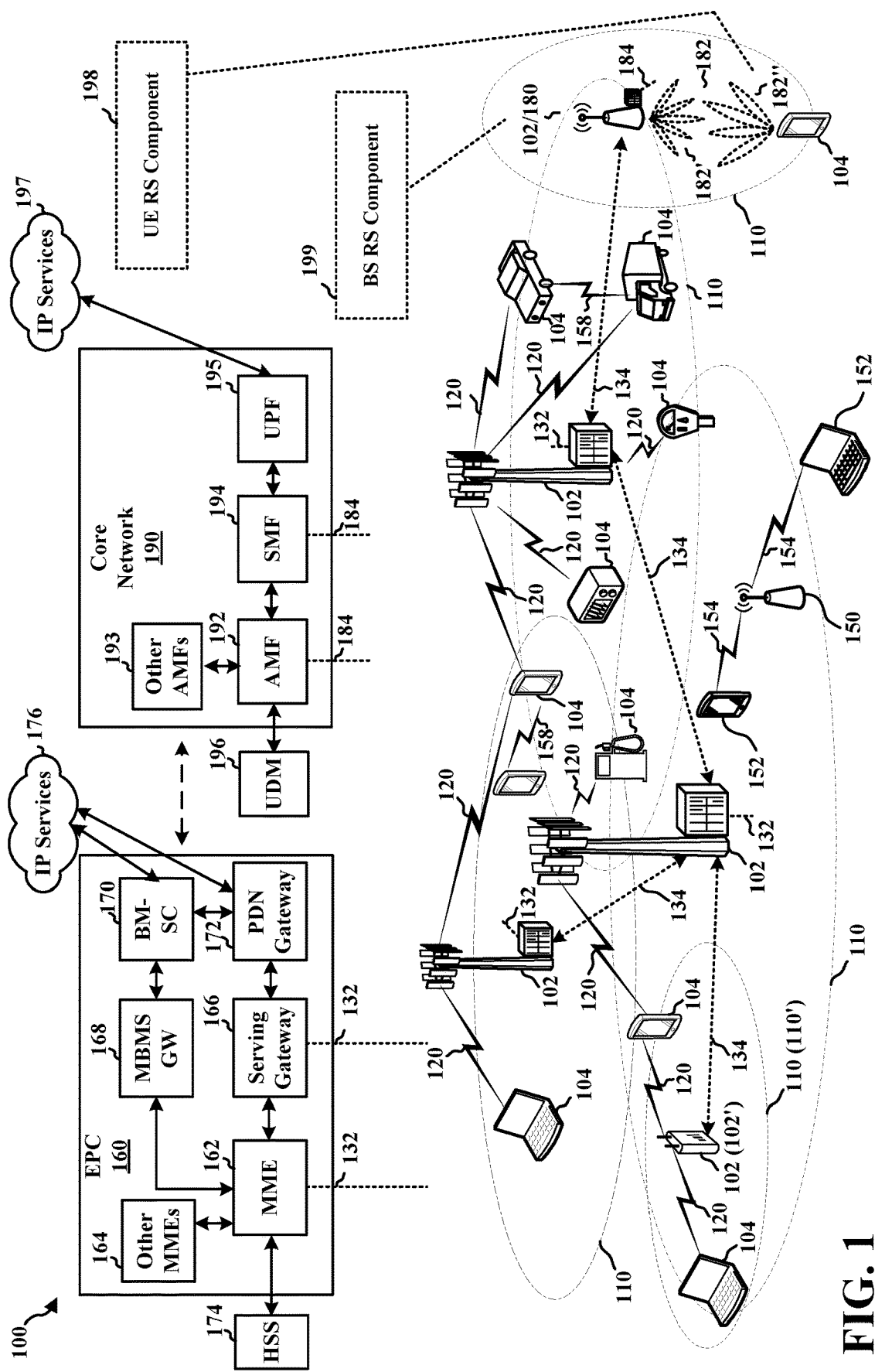
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In scenarios where a UE is severely limited by link budget, additional signal processing strategies may be necessary to help the UE decode downlink transmissions. For example, when the UE is located far away from a base station, the UE may experience a low signal to noise ratio, severely impacting the UE's channel quality estimation. With poor channel estimation, the UE may have difficulty in reliably receiving downlink data from the base station, resulting in low receiver performance. To account for low SNR and improve receiver performance on PDSCH, a UE may perform channel estimation based on CSI-RS. However, in some scenarios, the UE may experience a greater loss in performance on PDCCH than on PDSCH. While additional reference signals (RS) may be relied upon to improve channel estimation of a UE with low receiver performance, adding more reference signals may lead to larger overhead in resource usage, resulting in fewer symbols allocated for data transmission. Therefore, it would be helpful to enhance the performance of PDCCH by leveraging existing reference signals, e.g., based on the configured CSI-RS for PDSCH.

To improve the performance of PDCCH, the present disclosure allows for the RS of the PDSCH to assist the RS of the PDCCH, and for the RS of the PDSCH to assist the transmission of PDCCH. In a first aspect, the base station may configure a single CSI-RS port of the PDSCH that is associated with the PDCCH. In a second aspect, the UE may be configured to transmit a partial CSI report corresponding to the single CSI-RS port associated with the PDCCH. In a third aspect, the CSI-RS of the single CSI-RS port may be bundled with PDCCH DMRS for channel estimation. In a fourth aspect, the CSI-RS of the single CSI-RS port associated with the PDCCH may be configured with a predefined time domain slot pattern. In a fifth aspect, the CSI-RS of the single CSI-RS port associated with the PDCCH may be signaled, and a CSI-RS assistance mode may be triggered for assisting in channel estimation for PDCCH transmissions. Accordingly, by allowing for CSI-RS of the PDSCH to be associated with the PDCCH, the present disclosure may assist UEs and base stations in optimizing the channel for improved PDCCH reception (e.g. in low SNR environments) without requiring additional RS for the PDCCH to be transmitted.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE RS component 198 configured to receive a reference signal associated with a PDSCH, such as CSI-RS, and to use the reference signal to at least one of receive a PDCCH or measure the PDCCH and feedback a corresponding channel measurement for the PDCCH.

Referring again to FIG. 1, in certain aspects, the base station 180 may include a BS RS component 199 configured to configure a reference signal associated with a PDSCH for at least one of transmission of a PDCCH, or reception of a corresponding channel measurement for the PDCCH as feedback from a UE; and transmit the reference signal to the UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
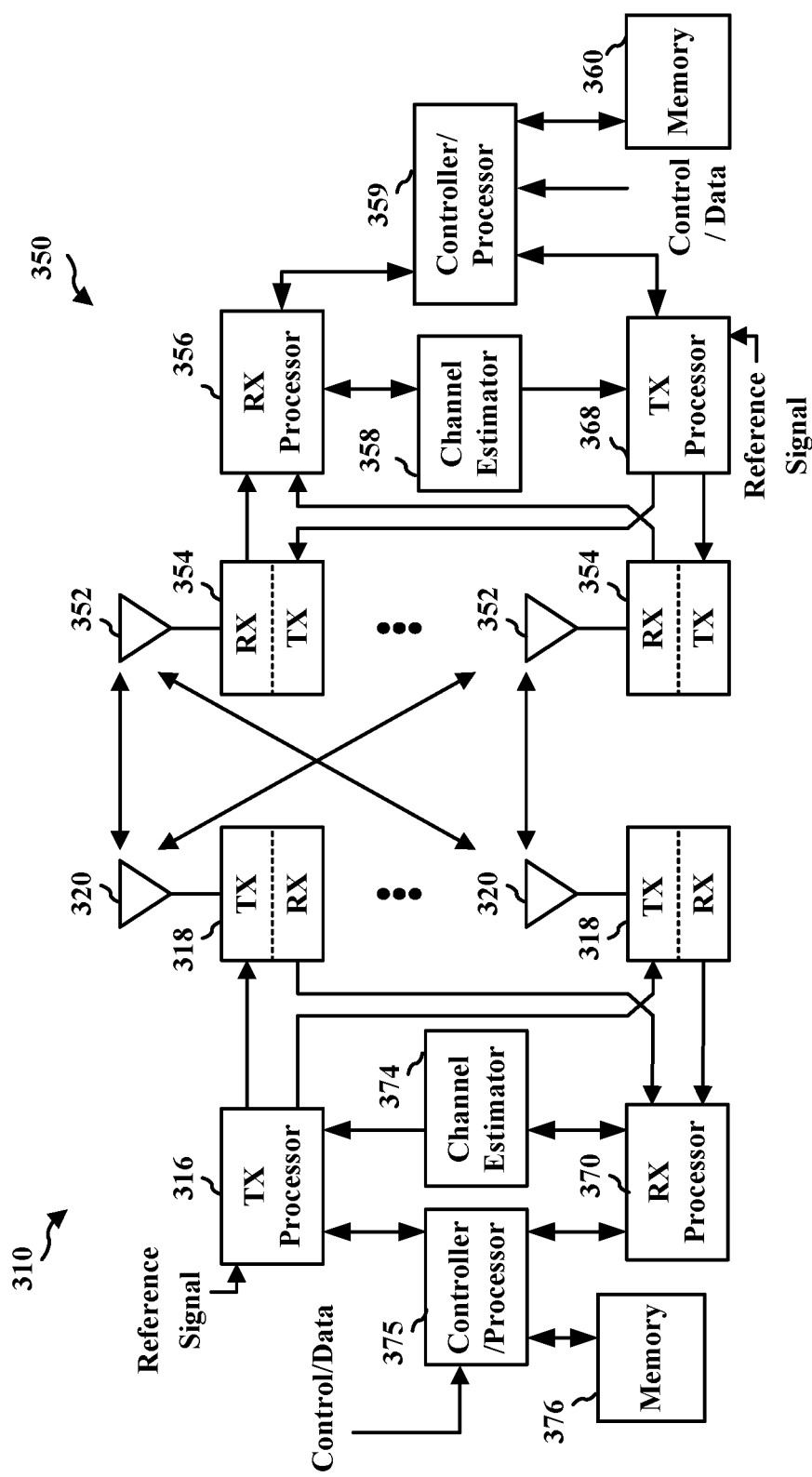
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE RS component 198 of FIG. 1.

At least one of the TX processor 316, the RX processor 370, and the controller/processor 375 may be configured to perform aspects in connection with BS RS component 199 of FIG. 1.

In scenarios where a UE is limited by link budget, additional signal processing strategies may be used to help the UE decode downlink transmissions. For example, when the UE is located far away from a base station, the UE may experience a low signal to noise ratio (SNR), impacting the UE's channel quality estimation. With poor channel estimation, the UE may have difficulty in reliably receiving downlink data from the base station, resulting in low receiver performance.

Additional reference signals (RS) may be relied upon to improve channel estimation of a UE with low receiver performance. However, adding more reference signals may increases reference signal overhead through the use of additional resources, resulting in fewer symbols that may be allocated for a data transmission. Aspects presented herein improve the receiver performance of the UE under such challenging environments (e.g. in locations with low SNR) by leveraging other reference signals, including those of the control channel (e.g., PDCCH) and data channel (e.g., PDSCH). In some scenarios, the PDCCH may experience more loss in receiver performance than the PDSCH. Therefore, aspects presented herein enable a UE to use the RS of the PDSCH to assist in receiving the PDCCH transmitted from the base station.

One type of RS which a UE may use to measure data channel (PDSCH) quality is CSI-RS. For example, CSI-RS may be used for channel state information (CSI) acquisition, as a basis for beam management (in addition to synchronization signal blocks (SSBs)), and for time-frequency tracking (as tracking reference signals (TRS)). CSI-RS transmission may be periodic (P-CSI-RS), aperiodic (A-CSI-RS), or semi-persistent (SP-CSI-RS). CSI-RS patterns may also be configured with a specified number of ports for transmission (e.g. 1, 2, 4, 8, 12, 16, 24, or 32 ports).

A UE may receive CSI-RS based on an RRC configuration. For example, for CSI acquisition, a CSI-RS configuration for a given UE may include various parameters such as a number of CSI-RS ports, a density (per RE per PRB per port), a code division multiplexing (CDM) type and length, locations of component RE patterns for a corresponding CSI-RS resource, and a scrambling identifier. CSI-RS-to-PDSCH power control offset values may also be supported. Moreover, a CSI-RS pattern may be configured to include Y adjacent REs in the frequency domain, and Z adjacent REs in the time domain. The following, partial table (Table 1) illustrates an example of several parameters that may be configured for CSI-RS:

TABLE 1

| Row # | X (#ports) | Density [RE/RB/port] | N | (Y, Z) | CDM |
|---|---|---|---|---|---|
| 1 | 1 | 3 | 1 | (1, 1) | No CDM |
| 2 | 1 | 1, 0.5 | 1 | (1, 1) | No CDM |
| 3 | 2 | 1, 0.5 | 1 | (2, 1) | FD-CDM2 |
| 4 | 4 | 1 | 1 | (2, 1) | FD-CDM2 |
| 5 | 4 | 1 | 2 | (2, 2) | FD-CDM2 |
| ... | ... | ... | ... | ... | ... |

Figures 4A, 4B:
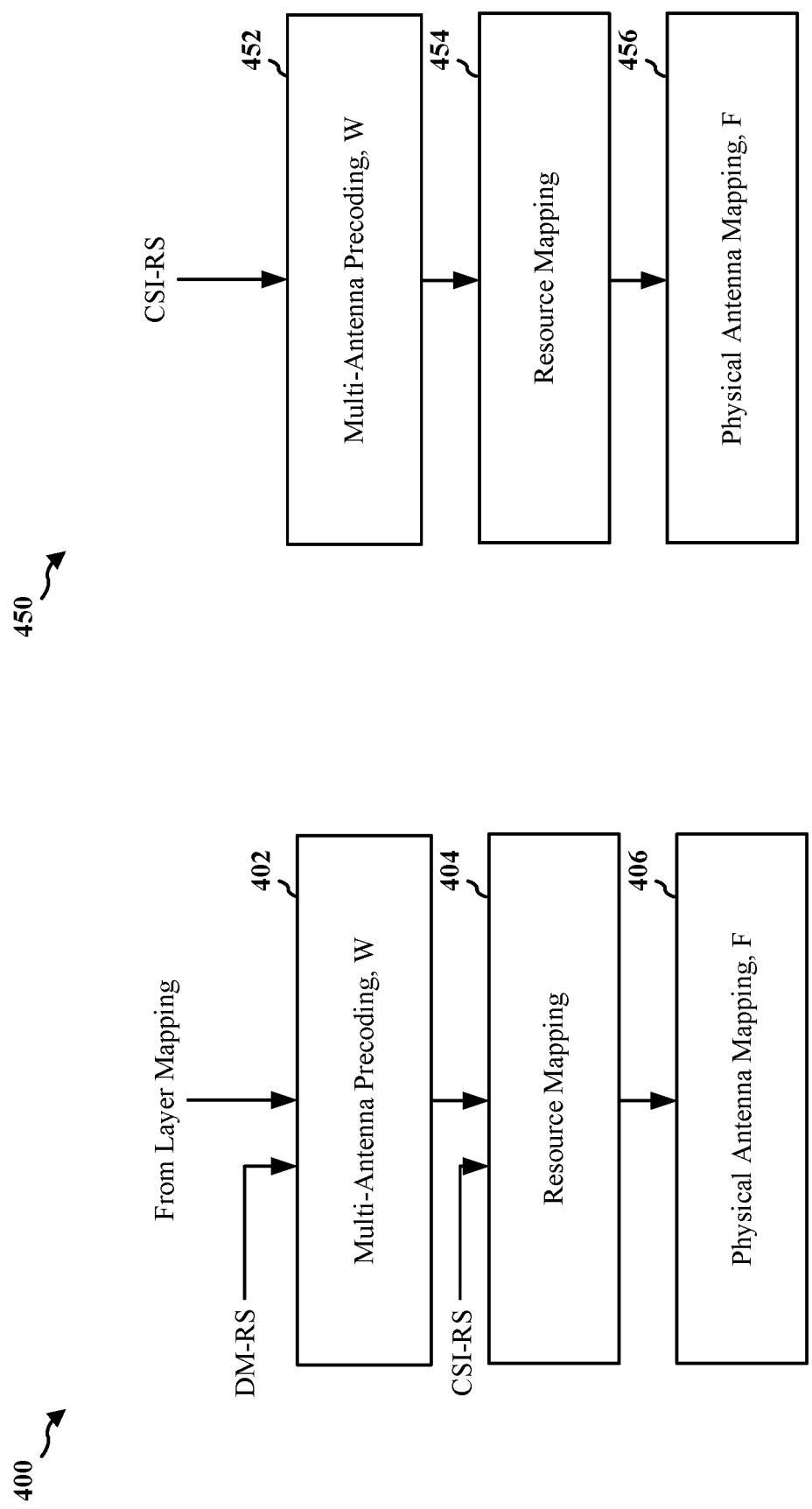
FIGS. 4A and 4B are diagrams illustrating examples of partial steps in PDSCH transmission.

For a configured port, the CSI-RS may be used for channel estimation or beamforming. FIG. 4A illustrates an example diagram 400 of PDSCH transmission when CSI-RS is used for channel estimation, and FIG. 4B illustrates an example diagram 450 of PDSCH transmission when CSI-RS is used for beamforming. In the example of FIG. 4A, the CSI-RS port does not include precoding information, while in the example of FIG. 4B, the CSI-RS port is associated with one specific precoding configuration.

Referring to FIG. 4A, after the data on PDSCH is mapped to one or more layers, at 402, the data is precoded with DM-RS to form a multi-antenna precoding matrix W. Subsequently, at 404, the precoded data and DM-RS are mapped to various resource elements along with the CSI-RS, and at 406, the resources are mapped to physical antennas to form a physical antenna mapping matrix F. The data, DM-RS, and CSI-RS are subsequently transmitted to the UE. Thus, in this example, as the CSI-RS is mapped to resources after the precoding in this example, the CSI-RS includes channel information but does not include any precoding configuration. After the UE receives the transmission, the UE can perform channel estimation by measuring the quality of the channel based on a given sequence for the CSI-RS. The UE may then transmit a CSI report to the base station, which may include feedback regarding the channel including at least a CSI-RS resource indicator (CRI), a rank indicator (RI), channel quality information (CQI), and a layer indicator (LI). The base station may then modify the PDSCH transmission based on the CSI report.

In contrast, in the example of FIG. 4B, each CSI-RS port may be associated with a specific beamforming configuration. Therefore, at 452, the CSI-RS port is precoded along with the other information in PDSCH to form the multi-antenna precoding matrix W, before being mapped to resource elements at 454 and subsequently to physical antennas to form the physical antenna mapping matrix F at 456. Thus, in this example, the CSI-RS includes precoding information as well as channel information. Accordingly, if multiple CSI-RS ports are configured, each port may be associated with a different precoding configuration. When the data, DM-RS, and CSI-RS are transmitted to the UE, the UE may measure the channel quality based on CSI-RS from the multiple ports and detect which CSI-RS port (i.e. precoding) results in the best reception. The UE may then transmit a CSI report to the base station with feedback regarding the channel including at least CRI, RI, a precoding matrix indicator (PMI), CQI, and LI. The base station may then modify the PDSCH transmission based on the CSI report.

Thus, CSI-RS allows for improved receiver performance in receiving PDSCH. However, in some scenarios, the UE may experience a greater loss in performance on PDCCH than on PDSCH. For example, while PDSCH may support up to eight layers for transmission, PDCCH may support at most a single layer that is mapped to a single port (e.g., 2000). Thus, when the UE is in a location with low SNR (e.g. far away from the base station), the channel quality of PDCCH may be worse than the channel quality of PDSCH. Although the UE may transmit up to thirty-two CSI reports to the base station to improve data transmission for PDSCH (one CSI report corresponding to each configured CSI-RS port), the control information on PDCCH is not updated based on CSI report feedback. Aspects presented herein enhance the performance of PDCCH using a configured CSI-RS for PDSCH.

To improve the performance of PDCCH, the present disclosure allows for the RS of the PDSCH to assist the RS of the PDCCH, and for the RS of the PDSCH to assist the transmission of PDCCH. The base station may configure a single CSI-RS port of the PDSCH that is associated with the PDCCH, e.g., that the UE can use to improve reception of the PDCCH and/or to provide a CSI report that the base station uses to improve transmission of the PDCCH. In some examples, the UE may be configured to transmit a CSI report corresponding to the single CSI-RS port associated with the PDCCH. The CSI report may be a reduced CSI report that includes partial information (e.g., part of the aforementioned parameters CRI, RI, PMI, CQI, LI, etc., e.g., at least including CQI or PMI). In a third aspect, the CSI-RS of the single CSI-RS port may be bundled with, e.g., used together with, PDCCH DMRS for channel estimation. The CSI-RS of the single CSI-RS port associated with the PDCCH may be configured with a predefined time domain slot pattern relative to the aforementioned, legacy CSI-RS configuration associated with PDSCH. The CSI-RS of the single CSI-RS port associated with the PDCCH may be signaled (e.g. in a new CSI-RS port pattern associated with the PDCCH, from a legacy single port CSI-RS associated with the PDSCH, or from one legacy port CSI-RS of a multi-port configuration associated with the PDSCH), and a CSI-RS assistance mode triggered for assisting in channel estimation for PDCCH transmissions. Therefore, by allowing for CSI-RS of the PDSCH to be associated with the PDCCH, the present disclosure may assist UEs and base stations in optimizing the channel for improved PDCCH reception (e.g. in low SNR environments) without requiring additional RS for the PDCCH to be transmitted. Furthermore, support for CSI reports corresponding to the PDCCH, channel estimation of PDCCH based on CSI-RS and DMRS of the PDCCH, preconfigured CSI-RS time domain patterns, and CSI-RS signaling and triggering may further serve to optimize reception of PDCCH.

Figure 5:
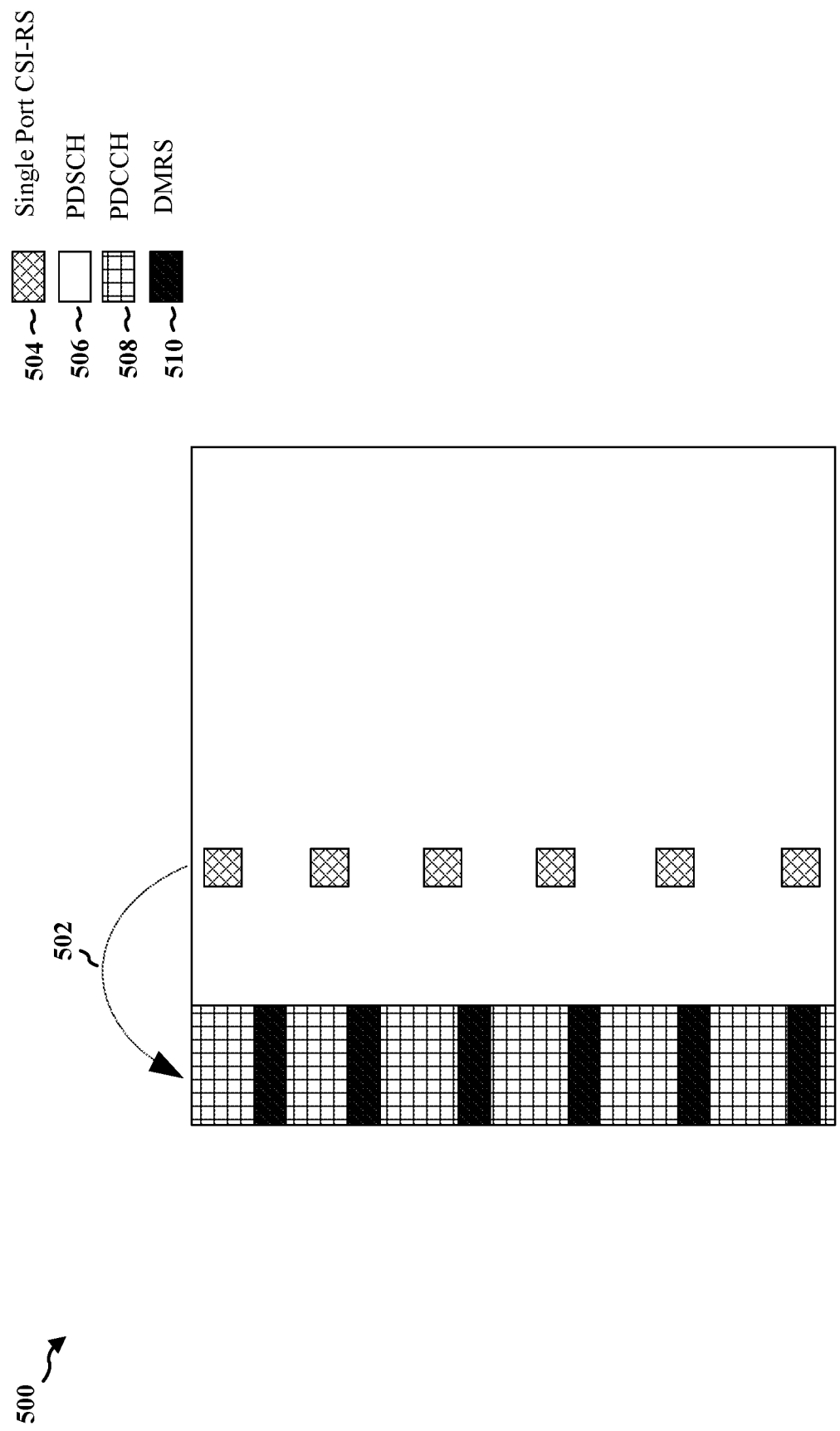
FIG. 5 is a diagram illustrating an example of a single port CSI-RS associated with PDCCH.

Referring to the first aspect, the base station may configure one single CSI-RS port of the PDSCH to be associated with the PDCCH. FIG. 5 illustrates an example diagram 500 illustrating an association 502 of a single port CSI-RS 504 in PDSCH 506 with PDCCH 508 (including DMRS 510). The association 502 allows a single CSI-RS port of the PDSCH to assist the UE in receiving information on the PDCCH. While multiple CSI-RS ports and patterns may be defined for PDSCH, the control channel may be limited to one port, and therefore a single port is associated for CSI-RS in this example. Thus, the single CSI-RS port that is associated with the PDCCH may be a pure single port configuration for the CSI-RS or may be one of a multiple port CSI-RS configuration.

The base station may configure one single CSI-RS port for cell-specific transmission. Although a CSI-RS in PDSCH 506 is generally UE-specific, the PDCCH includes cell-specific transmissions. Therefore, when associating the CSI-RS with the PDCCH 508, the base station may configure the single port CSI-RS 504 to be cell-specific. The base station may configure the cell-specific, single port CSI-RS 504 in various ways. For example, the single CSI-RS port associated with PDCCH 508 may be based on a pure, single port configuration for the CSI-RS 504 in PDSCH 506. For example, if the UE-specific CSI-RS for PDSCH is currently configured with only one port (e.g. Rows 1 and 2 in Table 1 above), the single, cell-specific CSI-RS port associated with PDCCH 508 may be similarly configured to be that same port. In another example, the single CSI-RS port associated with PDCCH 508 may be based on one of the multi-port configurations for the CSI-RS 504 in PDSCH 506. For example, if the UE-specific CSI-RS for PDSCH is currently configured with two or more ports for PDSCH (e.g. Row 3 in Table 1 above), the single, cell-specific CSI-RS port associated with PDCCH 508 may be selected to be one of those two or more ports. The selected port may be preconfigured by the network (e.g. by core network 190) or determined by the base station.

Once the single CSI-RS port is determined for the PDCCH, the base station may build an association or relationship (e.g. the association 502) between the single CSI-RS port and the PDCCH 508. For example, the base station may indicate an association of one of the CSI-RS port(s) configured for PDSCH with the PDCCH. As a result of the association 502, the cell-specific CSI-RS from the single CSI-RS port may effectively serve as a repetition of the DMRS 510 transmitted in PDCCH 508. That is, the UE may perform channel estimation of PDCCH based on both the DMRS 510 and the single port CSI-RS 504, as opposed to merely performing channel estimation for the PDCCH using the DMRS.

The base station may signal to the UE the existence of the association between the CSI-RS in PDSCH 506 and the PDCCH 508. For example, the base station may signal an indication of association 502 to the UE via downlink control information (DCI), a medium access control-control element (MAC-CE), and/or a RRC message. For instance, the base station may indicate in a DCI, MAC-CE, and/or a RRC message which CSI-RS port configured for PDSCH is further configured to correspond to the PDCCH.

The single CSI-RS of PDSCH 506 may include the same precoding as the PDCCH 508. For example, referring to FIG. 4B above, the single port CSI-RS 504 may be precoded with the DMRS 510 to form the precoding matrix W. The single CSI-RS of PDSCH 506 may also include the same power as the PDCCH DMRS 510. For example, the single port CSI-RS 504 may include the same power control offset as the DMRS. Alternatively, the single CSI-RS of PDSCH may include a specific difference in power than the PDCCH DMRS 510. Such power difference may be shared between the base station and the UE.

Once the UE identifies the association 502 (e.g. by receiving the indication in a DCI, MAC-CE, and/or a RRC message), the UE may process the CSI-RS according to one or more options. In one option, the UE may use the single port CSI-RS 504 together with the PDCCH DMRS 510 for channel estimation. The single port CSI-RS 504 may be bundled together with the PDCCH DMRS 510, e.g., the UE may estimate the channel quality of the PDCCH based on both the DMRS and the CSI-RS, thereby enhancing PDCCH DMRS channel estimation. The UE may thus improve decoding and receive the PDCCH as a result of the enhanced channel estimation based on the single port CSI-RS 504 and the DMRS 510. In another option, the UE may estimate the channel quality of PDCCH based, at least in part, on the single port CSI-RS 504, and the UE may transmit a CSI report corresponding to the CSI-RS port to the base station. For example, the CSI report may include at least the CQI reflecting the performance of PDCCH. The base station may adjust subsequent transmissions on PDCCH based on the CSI report. The UE may perform one of the options described above; alternatively, the UE may perform both options. For example, the UE may estimate the channel quality of PDCCH based on both the single port CSI-RS 504 and the DMRS 510, and transmit the CSI report corresponding to the single port CSI-RS accordingly.

Referring to the second aspect, after performing channel estimation, when the UE transmits a CSI report to the base station corresponding to the single port CSI-RS 504 associated with PDCCH 508, the CSI report may include partial information with respect to legacy CSI reports. For example, while legacy CSI reports corresponding to PDSCH CSI-RS generally include various information (e.g. CQI, PMI, RI, LI, etc.), a portion of that information may be relevant to CSI reports corresponding to the single port CSI-RS 504 associated with PDCCH. As an example, PDCCH may support at most a single layer that is mapped to a single port, and therefore LI may not be included in the CSI report. In contrast, since the CSI report may primarily be used to provide feedback as to PDCCH channel quality, the CSI report may at least include CQI.

The UE may feedback the partial CSI report or partial information according to at least one of three options. In one option, the network (e.g. core network 190) may define a separate signaling mechanism which the base station may use to indicate to the UE to perform and report the measurement. For example, one or more separate RRC messages other than for PDSCH CSI-RS measurement/reporting may be defined that the base station may use to indicate for the UE to measure the channel quality of PDCCH (or other parameters) based on the single port CSI-RS 504 and send a partial CSI report of at least CQI (or other parameters) to the base station. The base station may subsequently adjust the PDCCH transmission based on the partial CSI report. In another option, the UE may maintain a legacy CSI-RS measurement configuration (e.g. as for PDSCH CSI-RS) and report a full CSI report from which the base station may obtain the partial information. For example, the UE may measure the channel quality of the PDCCH and other parameters and report a legacy CSI report (e.g. with CQI, PMI, RI, LI, etc.). When the base station receives the full CSI report, the base station may discard one or more parameters based on the association 502 (e.g. PMI, RI, LI, etc.) such that the legacy CSI report effectively includes at least CQI, and the base station may adjust the PDCCH transmission based on the partial information accordingly. In a further option, the UE may maintain the legacy CSI-RS measurement configuration (e.g. perform measurements for a full CSI report), but the network may define an additional indication which the base station may use to trigger the UE to send a partial CSI report. For example, a separate RRC message other than for PDSCH CSI-RS reporting may be defined that the base station may use to indicate for the UE to send a partial CSI report corresponding to the single port CSI-RS 504 including one or more measured parameters (e.g. at least CQI). When the base station receives the partial CSI report, the base station adjust the PDCCH transmission accordingly.

With respect to the options above, the base station may trigger the UE to report the partial CSI report or partial information based on an indication in a DCI, MAC-CE, or an RRC message. For example, the base station may send a RRC message indicating for the UE to report at least CQI corresponding to the single port CSI-RS 504. The DCI, MAC-CE, or RRC message may also indicate which of the aforementioned options the UE may apply for reporting the partial information (e.g. based on separate signaling or using legacy configurations). The CSI report corresponding to the single port CSI-RS 504 may be configured with RRC signaling.

Referring to the third aspect, the single port CSI-RS 504 may be bundled with PDCCH DMRS 510 for the UE to perform channel estimation of PDCCH. That is, the single port CSI-RS 504 may be configured such that the UE may use both the single port CSI-RS 504 and DMRS 510 to estimate the channel quality of PDCCH. The UE may receive an indication from the base station of the single-port CSI-RS configuration for bundling (e.g. which PDSCH CSI-RS port is to considered with DMRS for PDCCH channel estimation) according to one or more options. The base station may indicate the single-port CSI-RS configuration based on pre-defined rules which are signaled in one or more RRC messages to the UE. For example, the network (e.g. core network 190) may preconfigure one of the defined PDSCH CSI-RS ports to be associated with PDCCH DMRS 510, and the base station may indicate this configuration in an RRC message to the UE. The UE may subsequently perform channel estimation of the PDCCH based on the preconfigured single port CSI-RS and DMRS. The indication may be triggered in a RRC message, MAC-CE or DCI. For example, the base station may indicate which configured PDSCH CSI-RS port is to be associated with PDCCH DMRS 510 in a RRC message, MAC-CE, or DCI. The UE may subsequently perform channel estimation of the PDCCH based on the indicated single port CSI-RS and DMRS.

Figure 6A:
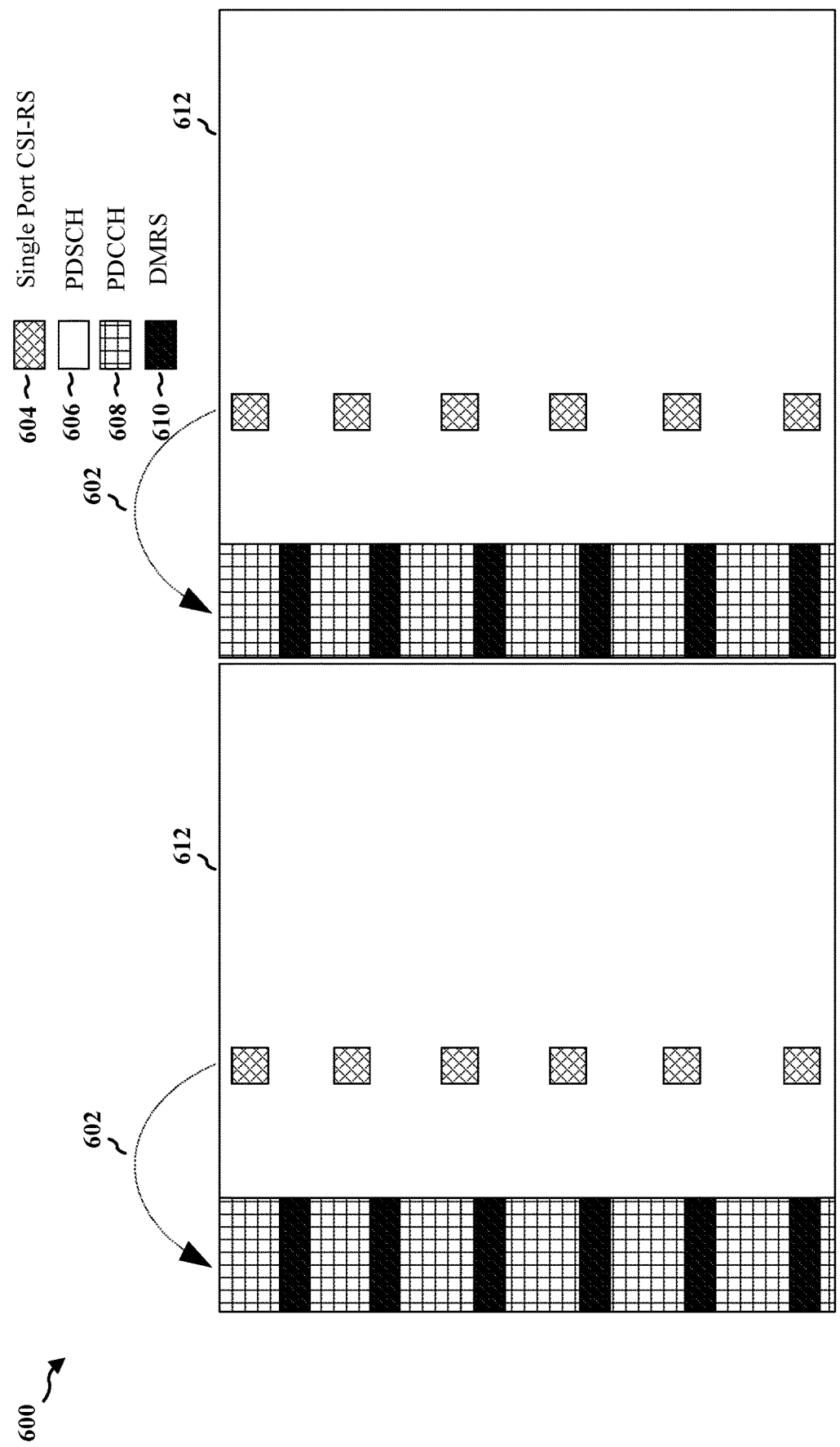
FIGS. 6A and 6B are diagrams illustrating examples of slots including single port CSI-RS associations with PDCCH.
Figure 6B:
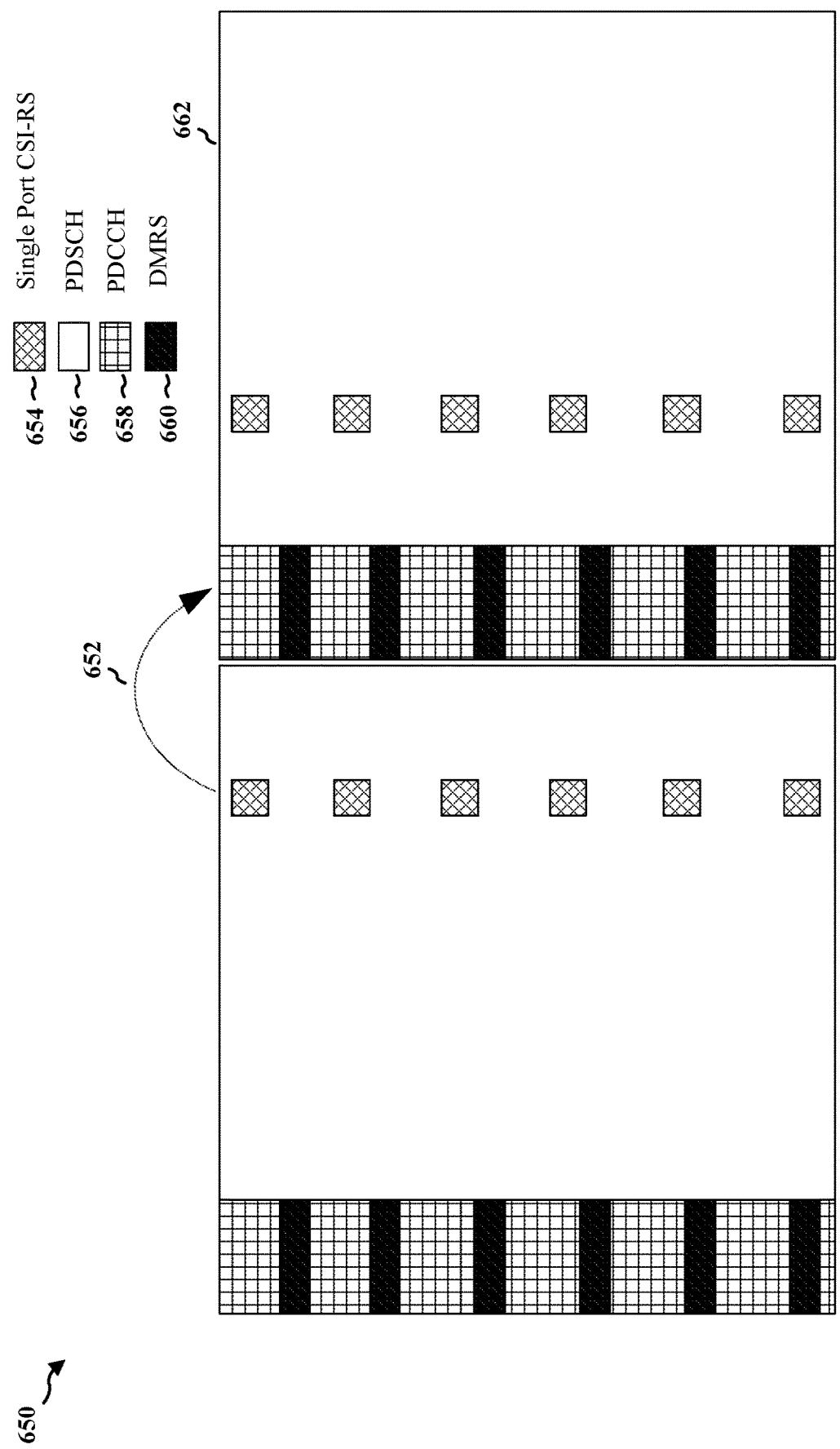

The base station may provide a timeline indication, which identifies the PDCCH DMRS to be bundled with the preconfigured or triggered single port CSI-RS. The timeline indication may be configured based on one of multiple options. For example, in one option, the single port CSI-RS 504 may be bundled with the PDCCH DMRS 510 in the same slot, while in another option, the single port CSI-RS 504 may be bundled with the PDCCH DMRS in the next slot. Thus, the association 502 of the single port CSI-RS 504 with the PDCCH DMRS 510 may correspond to a same slot or a following slot. FIG. 6A illustrates an example diagram 600 of an association 602 of a single port CSI-RS 604 in PDSCH 606 with a PDCCH 608 including DMRS 610 in a same slot 612, while FIG. 6B illustrates an example diagram 650 of an association 652 of a single port CSI-RS 654 in PDSCH 656 with a PDCCH 658 including DMRS 660 in a next slot 662. Association 602, 652, single port CSI-RS 604, 654, PDSCH 606, 656, PDCCH 608, 658, and DMRS 610, 660 of FIGS. 6A and 6B may respectively correspond to association 502, single port CSI-RS 504, PDSCH 506, PDCCH 508, and DMRS 510 of FIG. 5.

The timeline indication for bundling single-port CSI-RS with PDCCH DMRS may be implemented by the UE or configured by the base station. That is, the UE may select or the base station may indicate (e.g. in a RRC message for example) whether the association 602, 652 of CSI-RS with DMRS corresponds to the same slot 612 or next slot 662. As an example, the association 602, 652 may be determined by the UE or configured by the base station based on the symbol(s) of the single port CSI-RS pattern relative to the PDCCH in a particular slot. For instance, in the example of FIG. 6B, the single port CSI-RS 654 may be in a symbol closer to that of the PDCCH in next slot 662 than that of the PDCCH in the same slot (in contrast to the single port CSI-RS 604 of FIG. 6A). Therefore, in the example of FIG. 6B, the base station may configure association 652 to correspond to the next slot rather than the same slot as in association 602, since the next slot's PDCCH DMRS 660 may provide a more time-accurate channel estimate when combined with the single port CSI-RS than the same slot's PDCCH DMRS than in the example of FIG. 6A.

Figure 7A:
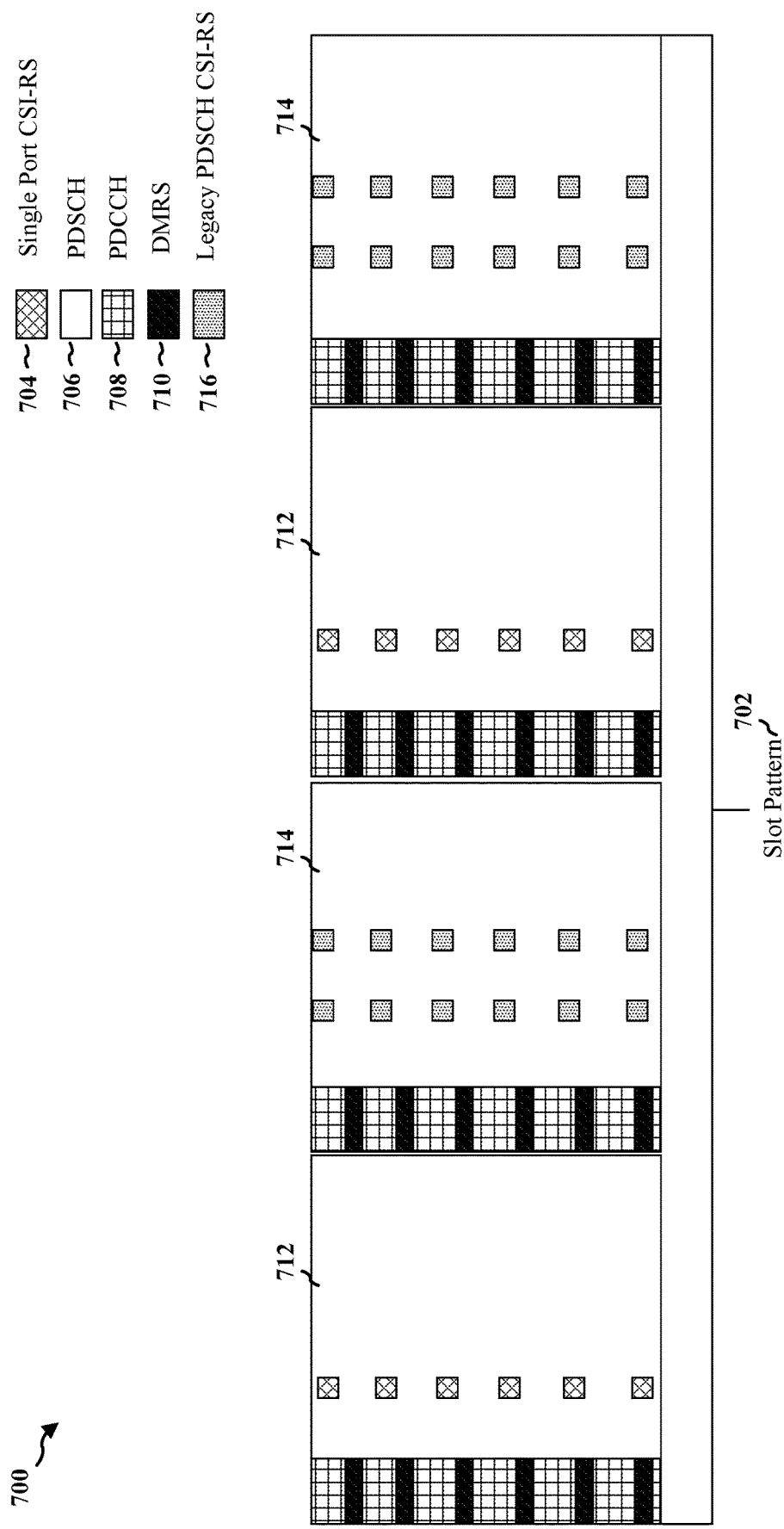
FIGS. 7A and 7B are diagrams illustrating examples of slot patterns including single port CSI-RS associations with PDCCH.

Referring to the fourth aspect, the single port CSI-RS 504, 604, 654 may be configured to include a predefined pattern, for example, a preconfigured time domain slot pattern, with respect to a legacy PDSCH CSI-RS configuration. In one example, predefined rules may be configured by the network (e.g. core network 190) which indicate that single port CSI-RS associated with PDCCH may be transmitted in alternating slots with legacy PDSCH CSI-RS (e.g. single-port CSI-RS for PDCCH is transmitted every other slot), or in a defined density in terms of slots with respect to legacy PDSCH CSI-RS (e.g. single-port CSI-RS for PDCCH is transmitted every one of ten slots, or some other ratio). FIG. 7A illustrates an example diagram 700 of a slot pattern 702 illustrating a single port CSI-RS 704 in PDSCH 706 associated with a PDCCH 708 including DMRS 710 in slots 712. The slots 712 may be configured based on predefined rules to alternate with respect to slots 714 carrying legacy PDSCH CSI-RS 716. For example, slots 712 may be configured to occur every other slot with slots 714. Alternatively, the single port CSI-RS 704 may be configured with a defined density other than every other slot (e.g. 0.5). For example, the single port CSI-RS 704 may be configured with a density such each slot 712 precedes nine slots 714 carrying legacy PDSCH CSI-RS 716 (e.g. a density of 10% or 0.1), or any other densities.

Figure 7B:
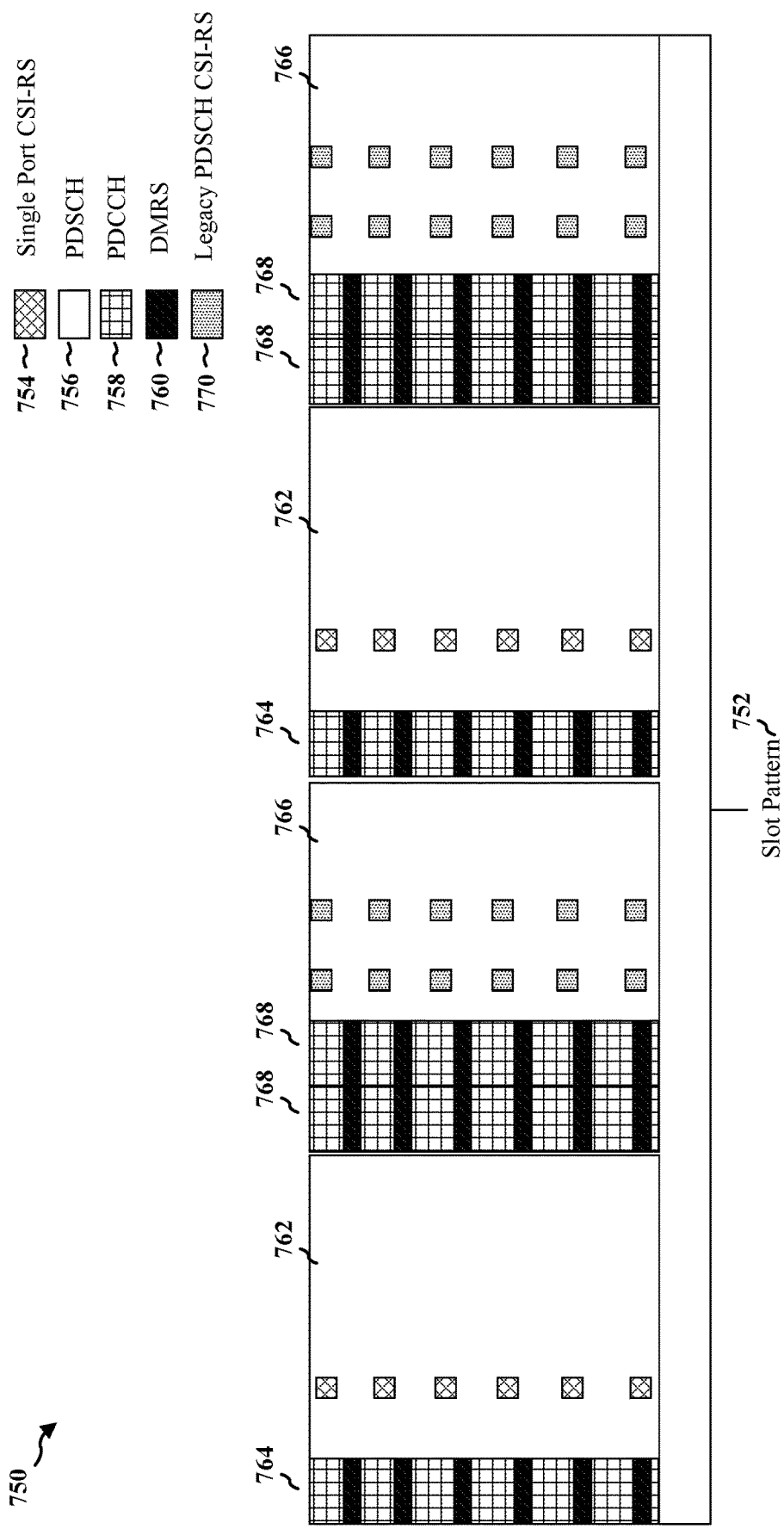

In another example, predefined rules may be configured by the network that trigger single-port CSI-RS 504, 604, 654 to be transmitted in a particular slot (to enhance PDCCH reception) based on a number of symbols of the PDCCH. For instance, if the PDCCH of a particular slot spans one symbol, the single port CSI-RS may triggered to be transmitted in that same slot, while if the PDCCH of a particular slot spans more than one symbol, the single port CSI-RS may be omitted from that same slot and the legacy PDSCH CSI-RS is transmitted in that slot instead. FIG. 7B illustrates an example diagram 750 of a slot pattern 752 illustrating a single port CSI-RS 754 in PDSCH 756 associated with a PDCCH 758 including DMRS 760 in slots 762. The single port CSI-RS 754 may be configured based on predefined rules to be transmitted in slots 762 with PDCCH spanning a single symbol 764, and to be omitted in slots 766 with PDCCH spanning multiple symbols 768. Instead, slots 766 may carry legacy PDSCH CSI-RS 770. As the DMRS 760 in slots 762 span a single symbol 764, the additional symbols carrying single port CSI-RS 754 may help to improve PDCCH channel estimation than based on DMRS alone. However, since the DMRS in slots 766 span multiple symbols 768, the UE may in those slots be able to successfully perform PDCCH channel estimation based on DMRS alone, and therefore the single port CSI-RS may be replaced with legacy PDSCH CSI-RS in such slots to enhance PDSCH channel estimation.

With respect to the fifth aspect, the single port CSI-RS 504, 604, 654, 704, 754 may be signaled by the base station according to one or more options. In one option, the base station may transmit the single port CSI-RS according to a predefined pattern different than legacy PDSCH CSI-RS patterns. In another option, the base station may transmit the single port CSI-RS according to the pattern configured for a single port legacy PDSCH CSI-RS. For example, if the legacy PDSCH CSI-RS is configured with only one port (e.g. Rows 1 and 2 in Table 1 above), the single port CSI-RS associated with PDCCH may be transmitted in a same pattern as that of the legacy PDSCH CSI-RS. In a further option, the base station may transmit the single port CSI-RS according to the pattern configured for one port of a multiple port legacy PDSCH CSI-RS. For example, if the legacy PDSCH CSI-RS is configured with multiple ports (e.g. Row 3 in Table 1 above), the single port CSI-RS associated with PDCCH may be transmitted in a same pattern as that of one of the multiple ports for the legacy PDSCH CSI-RS.

Moreover with respect to the fifth aspect, the base station may trigger a UE to use a CSI-RS assistance mode for PDCCH transmission. That is, the base station may trigger the UE to associate a legacy PDSCH CSI-RS with a corresponding PDCCH (e.g. the single port CSI-RS 504, 604, 654, 704, 754) for improved channel estimation or PDCCH reception, e.g. according to one or more of the various options described above. In one example, the CSI-RS assistance mode may be triggered based on a scenario experienced by the UE, e.g., bad PDCCH propagation or worse PDCCH transmission than PDSCH. For example, if the UE does not successfully detect a PDCCH transmission from the base station based on DMRS alone, or if the base station does not receive feedback from the UE acknowledging reception of the PDCCH, the base station may determine that the propagation is bad and thus may trigger the CSI-RS assistance mode. In another example, the CSI-RS assistance mode may be triggered based on a type or capability of the UE, e.g., a low-complexity UE with limited PDCCH processing. For example, if the UE is capable of limited PDCCH DMRS estimation or fails to timely provide channel state feedback, the base station may trigger the CSI-RS assistance mode to improve PDCCH channel estimation or PDCCH reception of the UE.

Figure 8:
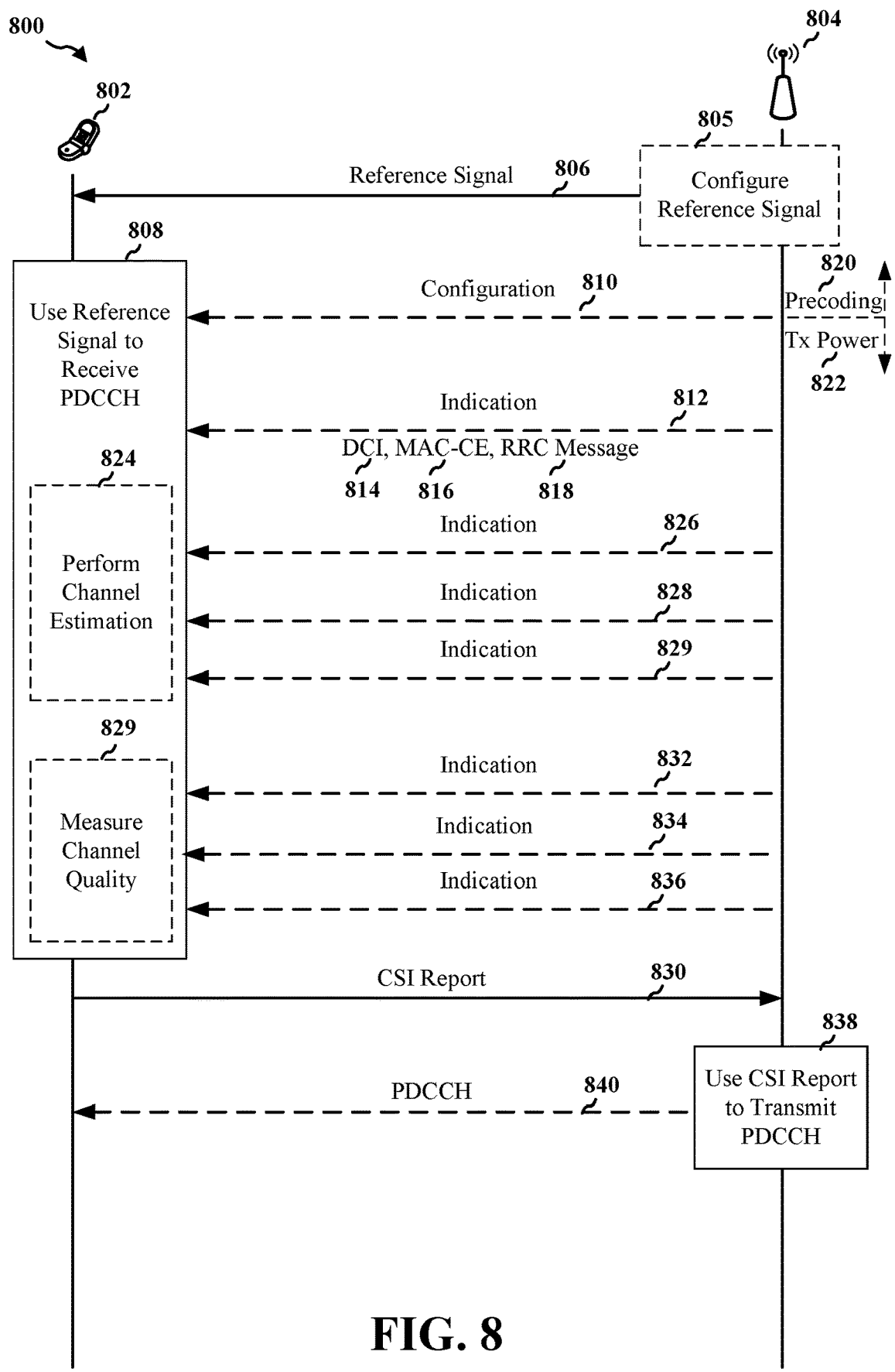
FIG. 8 is a call flow diagram illustrating an example of wireless communication between a UE and a base station.

FIG. 8 illustrates a call flow diagram 800 of an example of wireless communication between a UE 802 (e.g. UE 104, 350) and a base station 804 (e.g. base station 102/180, 310) in accordance with the various aspects of the present disclosure. At 805, the base station 804 configures a reference signal 806 associated with a PDSCH (e.g. PDSCH 506, 606, 656, 706, 756) to the UE 802. The reference signal may be, for example, a CSI-RS (e.g. single port CSI-RS 504, 604, 654, 704, 754). In a first configuration, the base station may configure the reference signal 806 for assistance to the UE in receiving a PDCCH. For example, the base station may configure the CSI-RS with the same precoding as a PDCCH DMRS, or with a same transmission power as (or a specific power difference from) the PDCCH DMRS. Moreover, the base station may configure the CSI-RS to be associated with the PDCCH DMRS to allow the UE to perform enhanced channel estimation by combining or bundling channel estimation performed using the CSI-RS with channel estimation performed using the PDCCH DMRS in order to improve reception of the PDCCH. In a second configuration, the base station may configure the reference signal 806 to enable the UE to provide a corresponding channel measurement for the PDCCH as feedback from the UE 802. For example, the base station may configure the CSI-RS to be associated with the PDCCH DMRS to allow the UE to measure and feedback a channel quality of the PDCCH to the base station. For example, the base station may configure the CSI-RS with the same precoding configuration, transmission power configuration, or other configuration as that of the PDCCH DMRS, such that the UE may consider a measured channel quality based on the CSI-RS to be the same as the PDCCH quality.

The base station 804 may configure the reference signal 806 for transmission of the PDCCH (i.e. the first configuration), for reception of the corresponding channel measurement for the PDCCH as feedback from the UE 802 (i.e. the second configuration), or to allow both configurations. The base station may indicate to the UE which configuration(s) are applied for the reference signal 806. For instance, the base station may send an RRC message indicating that the UE may apply the first configuration, e.g. by combining the CSI-RS with the PDCCH DMRS for performing channel estimation and improved PDCCH reception, that the UE may apply the second configuration, e.g. by measuring the quality of the channel based on the CSI-RS and feeding back the measured channel quality to the base station, or that the UE may apply both configurations.

The base station 804 may then transmit the reference signal 806 to the UE 802. After the UE receives the reference signal 806 associated with the PDSCH from the base station, at 808, the UE uses the reference signal to receive a PDCCH (e.g. PDCCH 508, 608, 658, 708, 758) based on the first configuration, to measure the PDCCH to obtain a corresponding channel measurement for feedback to the base station based on the second configuration, or both. For example, the UE may perform channel estimation or measure channel quality of the PDCCH based on an association (e.g. association 502, 602, 652) configured by the base station between the reference signal 806 and the PDCCH to improve PDCCH reception as described according to any of the various aspects above.

In accordance with the first aspect, the base station may transmit a configuration 810 to the UE for the single port CSI-RS for cell-specific transmission of the CSI-RS that the UE uses to receive the PDCCH and/or measure the PDCCH at 808. For instance, referring to FIG. 5, the base station may send a configuration of the single port CSI-RS 504 for cell-specific transmission to the UE to be used to receive PDCCH 508. The configuration for PDCCH may be based on a pure, single port configuration for the PDSCH CSI-RS or based on one of a multi-port configuration for the PDSCH CSI-RS. Moreover, the base station may send an indication 812 of an association between the single CSI-RS port and the PDCCH for the UE to use to receive and/or measure the PDCCH at 808. For instance, referring to FIG. 5, after building the association 502 between the single CSI-RS port 504 and the PDCCH 508, the base station may signal to the UE the existence of the association between the CSI-RS in PDSCH 506 and the PDCCH 508. The indication of the association 502 may be signaled via a DCI 814, a MAC-CE 816, and/or a RRC message 818. Furthermore, the base station may configure the single port CSI-RS associated with the PDCCH to have at least one of a same precoding 820 as the PDCCH, a same transmission power 822 as a DMRS associated with the PDCCH, or a specific power difference from a transmission power of the PDCCH DMRS. For instance, referring to FIG. 5, the single CSI-RS of PDSCH 506 may include the same precoding as the PDCCH 508, or the single port CSI-RS 504 may include the same power control offset as the DMRS 510. If there is a specific power difference (e.g. the CSI-RS transmission power has a fixed difference from the DMRS transmission power), this specific power difference may be predefined (e.g. by the core network) or indicated by the base station 804 in a DCI, a RRC message, or a MAC-CE.

Still referring to the first aspect, at 824, the UE may use (at 808) the single port CSI-RS together with the PDCCH DMRS to receive the PDCCH based on the first configuration and perform channel estimation for the PDCCH. For example, referring to FIG. 5, after the UE identifies the association 502, the UE may consider the single port CSI-RS 504 to be bundled with the PDCCH DMRS 510 for channel estimation (i.e. the UE may estimate the channel quality of the PDCCH not only based on the DMRS but also based on the CSI-RS), the UE may estimate the channel quality of PDCCH based on the single port CSI-RS 504 and then transmit a CSI report corresponding to the CSI-RS port to the base station, and/or the UE may estimate the channel quality of PDCCH based on both the single port CSI-RS 504 and the DMRS 510 and transmit the CSI report corresponding to the single port CSI-RS accordingly.

In accordance with the third aspect, the base station may transmit and the UE may receive an indication 826 of the single port CSI-RS configured for use with the PDCCH DMRS to perform the channel estimation at 824. For example, the indication may indicate which PDSCH CSI-RS port is to be considered with DMRS for PDCCH channel estimation. In one example, the indication 826 may comprise a set of rules received in RRC signaling from the base station. For instance, referring to FIG. 5, the network may preconfigure one of the defined PDSCH CSI-RS ports to be associated with PDCCH DMRS 510, and the base station may indicate this configuration (e.g. the set of rules) in one or more RRC messages to the UE. In another example, the indication 826 may be received in DCI 814, MAC-CE 816, and/or RRC message 818. For example, referring to FIG. 5, the base station may indicate which configured PDSCH CSI-RS port is to be associated with PDCCH DMRS 510 in a RRC message, MAC-CE, or DCI.

Still referring to the third aspect, the base station may transmit and the UE may receive an indication 828 to use the single port CSI-RS with the PDCCH DMRS in a same slot to perform the channel estimation at 824. For example, the UE may receive a timeline indication from the base station which identifies that the single port CSI-RS may be bundled with the PDCCH DMRS in the same slot. For instance, referring to FIG. 6A, the indication may indicate that the association 602 of the single port CSI-RS 604 in PDSCH 606 is with the PDCCH 608 including DMRS 610 in the same slot 612. Alternatively, the UE may receive an indication 829 to use the single port CSI-RS with the PDCCH DMRS in a following slot to perform the channel estimation at 824. For example, the UE may receive a timeline indication from the base station which identifies that the single port CSI-RS may be bundled with the PDCCH DMRS in the next slot. For instance, referring to FIG. 6B, the indication may indicate that the association 652 of the single port CSI-RS 654 in PDSCH 656 is with the PDCCH 658 including DMRS 660 in the next slot 662.

In accordance with the second aspect, at 829, the UE may use (at 808) the single port CSI-RS to measure the PDCCH based on the second configuration. After performing the channel quality measurement (and channel estimation for the PDCCH if the first configuration is also applied), the UE may send a CSI report 830 to the base station based on the received CSI-RS and/or channel estimation. The CSI report 830 may comprise a reduced CSI report including at least a CQI or a PMI. For example, referring to FIG. 5, when the UE transmits the CSI report to the base station corresponding to the single port CSI-RS 504 associated with PDCCH 508, the CSI report may include partial information from legacy CSI reports that is relevant to the PDCCH. For instance, the CSI report may at least include CQI and/or PMI.

Still referring to the second aspect, the base station may transmit and the UE may receive an indication 832 from the base station to report the reduced CSI report 830 when the UE is measuring the channel quality at 829, during which the UE may measure the CSI-RS, and after which the UE may transmit the reduced CSI report based on the indication from the base station. The indication 832 may be received in at least one of the DCI 814, MAC-CE 816, and/or RRC message 818. For example, referring to FIG. 5, the network may define a separate signaling mechanism which the base station may use to indicate to the UE to perform and report the measurement. For example, one or more separate RRC messages other than for PDSCH CSI-RS measurement/reporting may be defined that the base station may use to indicate for the UE to measure the channel quality of PDCCH (or other parameters) based on the single port CSI-RS 504 and send a partial CSI report of at least CQI (or other parameters) to the base station. The base station may trigger the UE to report the partial CSI report or partial information based on an indication in the DCI, MAC-CE, or an RRC message.

In another example, when the UE is measuring the channel quality at 829, the UE may measure the CSI-RS and afterwards transmit the reduced CSI-RS report 830 based on a configuration for PDSCH CSI-RS. For instance, referring to FIG. 5, the UE may maintain a legacy CSI-RS measurement configuration (e.g. as for PDSCH CSI-RS) and report a full CSI report from which the base station may obtain the partial information. For example, the UE may measure the channel quality of the PDCCH and other parameters and report a legacy CSI report (e.g. with CQI, PMI, RI, LI, etc.), and the base station may discard one or more parameters irrelevant to PDCCH optimization based on the configured association 502.

In a further example, the base station may transmit and the UE may receive an indication 834 from the base station to report the reduced CSI report 830 when the UE is measuring the channel quality at 829, during which the UE may measure the CSI-RS based on a configuration for PDSCH CSI-RS, and after which the UE may transmit the reduced CSI report in response to receiving the indication 834 from the base station. For instance, referring to FIG. 5, the UE may maintain the legacy CSI-RS measurement configuration (e.g. perform measurements for a full CSI report), but the network may define an additional indication which the base station may use to trigger the UE to send a partial CSI report. For example, a separate RRC message other than for PDSCH CSI-RS reporting may be defined that the base station may use to indicate for the UE to send a partial CSI report corresponding to the single port CSI-RS 504 including one or more measured parameters (e.g. at least CQI).

In accordance with the fourth aspect, in one example, the reference signal 806 (e.g. CSI-RS) may be received based on a pattern including a density in slots. For instance, referring to FIG. 7A, the single port CSI-RS associated with PDCCH may be received in slots 712 configured based on predefined rules to alternate with respect to slots 714 carrying legacy PDSCH CSI-RS 716. For example, slots 712 may be configured to occur every other slot with slots 714. Alternatively, the single port CSI-RS 704 may be configured with a defined density other than every other slot (e.g. 0.5). For example, the single port CSI-RS 704 may be configured with a density such each slot 712 precedes nine slots 714 carrying legacy PDSCH CSI-RS 716 (e.g. a density of 10% or 0.1), or any other densities.

Still referring to the fourth aspect, in another example, the reference signal 806 (e.g. CSI-RS) may be present in a slot based on a number of symbols in which the PDCCH is transmitted in the slot. For instance, referring to FIG. 7B, the single port CSI-RS 754 may be configured based on predefined rules to be transmitted in slots 762 with PDCCH spanning a single symbol 764, and to be omitted in slots 766 with PDCCH spanning multiple symbols 768. Instead, slots 766 may carry legacy PDSCH CSI-RS 770.

In accordance with the fifth aspect, in one example, the reference signal 806 (e.g. CSI-RS) may be based on a single port CSI-RS pattern for use with the PDCCH. For instance, referring to FIGS. 5-7B, the base station may transmit the single port CSI-RS 504, 604, 654, 704, 754 according to a predefined pattern for PDCCH that is different than legacy PDSCH CSI-RS patterns. In another example, the reference signal 806 (e.g. CSI-RS) may be based on a single port CSI-RS for the PDSCH. For instance, referring to FIGS. 5-7B, the base station may transmit the single port CSI-RS 504, 604, 654, 704, 754 according to the pattern configured for a single port legacy PDSCH CSI-RS. In a further example, the UE may receive an indication 836 from the base station of the single port CSI-RS from a plurality of ports for PDSCH CSI-RS when the UE is performing the channel estimation at 824 and/or measuring the channel quality at 829. For instance, referring to FIGS. 5-7B, the base station may transmit the single port CSI-RS 504, 604, 654, 704, 754 according to the pattern configured for one port of a multiple port legacy PDSCH CSI-RS.

Still referring to the fifth aspect, in one example, the reference signal 806 may be associated with the PDCCH based on a configuration from a base station to operate in a mode in which the reference signal is associated with the PDCCH. For instance, referring to FIGS. 5-7B, the base station may trigger the UE to use a CSI-RS assistance mode for PDCCH transmission, i.e., the base station may trigger the UE to associate a legacy PDSCH CSI-RS with a corresponding PDCCH (e.g. the single port CSI-RS 504, 604, 654, 704, 754) for improved channel estimation or PDCCH reception as described above. In another example, the reference signal 806 may be associated with the PDCCH based on a propagation level for the PDCCH. For instance, the CSI-RS assistance mode may be triggered based on a scenario experienced by the UE, e.g., bad PDCCH propagation or worse PDCCH transmission than PDSCH. In a further example, the reference signal 806 may be associated with the PDCCH based on a type of the UE or a capability of the UE. For instance, the CSI-RS assistance mode may be triggered based on a type or capability of the UE, e.g., a low-complexity UE with limited PDCCH processing.

Subsequently, the base station receives the CSI report 830 from the UE based on the reference signal 806. For example, after the UE uses the reference signal 806 at 808 including measuring channel quality at 829 to generate a CSI report 830, the UE transmits to the base station the CSI report 830. Then, at 838, the base station uses the CSI report 830 to transmit a PDCCH 840 to the UE. For example, referring to FIGS. 5-7B, the base station may adjust subsequent transmissions on PDCCH based on the CSI report. For instance, the base station may adjust precoding or power of the transmission on PDCCH, change the number of symbols of PDCCH, etc.

Figure 9:
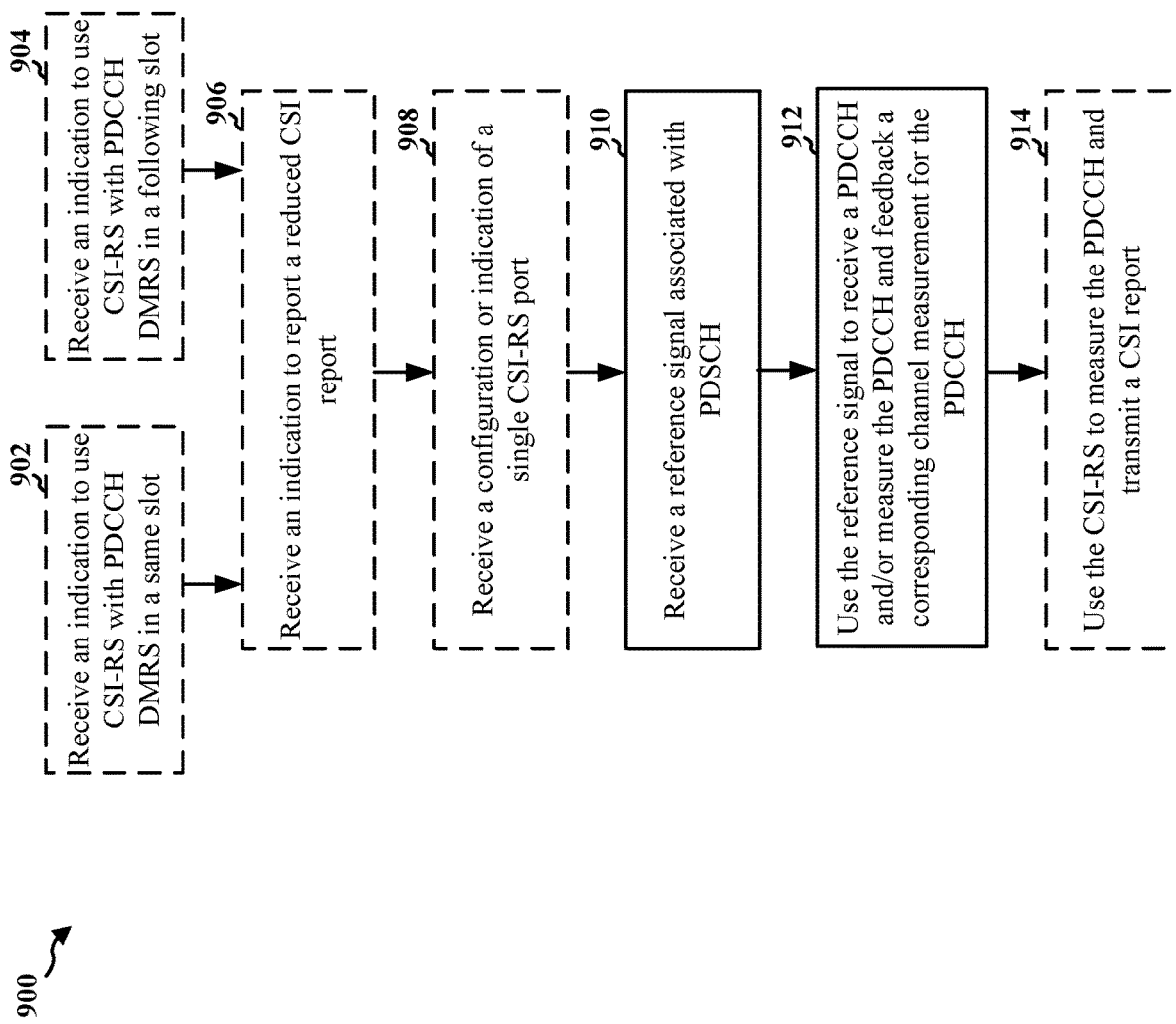
FIG. 9 is a flowchart of a method of wireless communication.

FIG. 9 is a flowchart 900 of a method of wireless communication. The method may be performed by a UE or a component of a UE (e.g., the UE 104, 350, 802; a processing system, which may include the memory 360 and which may be the entire UE 350 or a component of the UE 350, such as the TX processor 368, the RX processor 356, and/or the controller/processor 359). Optional aspects are illustrated with a dashed line. The method may improve PDCCH reception at a UE.

At 910, the UE receives a reference signal associated with a PDSCH. The reference signal may comprise a CSI-RS, for example. The CSI-RS may be received based a pattern including a density in slots, such as described in connection with FIGS. 7A and 7B. In some examples, the CSI-RS may be present in a slot based on a number of symbols in which the PDCCH is transmitted in the slot, such as described in connection with FIGS. 7A and 7B. The CSI-RS may be based on a single port CSI-RS pattern for use with the PDCCH. The CSI-RS may be based on a single port CSI-RS for the PDSCH or one of multiple-ports for CSI-RS for the PDSCH.

At 912, the UE uses the reference signal to at least one of receive a PDCCH or measure the PDCCH and feedback a corresponding channel measurement for the PDCCH, e.g., as described in connection with any of FIGS. 5-8. The CSI-RS that is associated with the PDCCH may have at least one of the same precoding as the PDCCH, the same transmission power as DM-RS associated with the PDCCH and/or a specific power difference from a transmission power of the DM-RS associated with the PDCCH. The specific power difference may be predefined or indicated in a DCI, a RRC message, or a MAC-CE. The UE may use the CSI-RS together with a PDCCH demodulation reference signal (DMRS) to receive the PDCCH and perform channel estimation for the PDCCH. In some examples, the UE may receive, e.g., at 908, an indication of a single port CSI-RS configured for use with the PDCCH DMRS to perform the channel estimation. The indication may include a set of rules received in RRC signaling. The indication may be received in DCI, an RRC message, or a MAC-CE.

As illustrated at 908, the UE may receive a configuration for a single port CSI-RS for cell specific transmission for the CSI-RS that the UE uses to at least one of receive the PDCCH or measure the PDCCH. The single port may be a pure single port configuration for the CSI-RS or nay be one port of a multiple port configuration for the CSI-RS. Alternately, at 908, the UE may receive an indication of an association between a single CSI-RS port and the PDCCH. Thus, an association may be established between the single CSI-RS port and the PDCCH. The indication may be received in DCI, a MAC-CE, and/or RRC message. As illustrated at 908, the UE may receive an indication of the single port CSI-RS from a plurality of ports for PDSCH CSI-RS. The reference signal associated with the PDCCH may be based on at least one of a configuration from a base station to operate in a mode in which the reference signal is associated with the PDCCH, a propagation level for the PDCCH, a type of the UE, or a capability of the UE.

As illustrated at 902, the UE may receive an indication to use the single port CSI-RS with the PDCCH DMRS in a same slot to perform the channel estimation. As illustrated at 904, the UE may receive an indication to use the single port CSI-RS with the PDCCH DMRS in a following slot to perform the channel estimation.

As illustrated at 914, when the UE uses the CSI-RS to measure the PDCCH, the UE may transmit a CSI report to a base station based on the CSI-RS. The UE may transmit, at 914, a CSI report to a base station based on the channel estimation for the PDCCH. The CSI report may comprise a reduced CSI report, e.g., including a CQI.

As illustrated at 906, the UE may receive an indication from the base station to report the reduced CSI report, where the UE measures the CSI-RS and transmits the reduced CSI report based on the indication from the base station. The indication may be received in DCI, a MAC-CE, and/or RRC message. The UE may measure the CSI-RS and transmit the reduced CSI-RS report based on a configuration for PDSCH CSI-RS, e.g., not based on a configuration that is specific to use with the PDCCH. At 906, the UE may receive an indication from the base station to report the reduced CSI report, and the UE may measure the CSI-RS based on a configuration for PDSCH CSI-RS and transmit the reduced CSI-RS report in response to receiving the indication from the base station.

An apparatus, which may be a UE or a component of a UE, may include components that perform each of the blocks of the algorithm in the aforementioned flowchart of FIG. 9, as well as any of the aspects performed by the UE 802 in FIG. 8. As such, each block in the aforementioned flowchart of FIG. 9, as well as any of the aspects performed by the UE 802 in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. The processing system may be a component of the UE 350 and may include the memory 360 and/or at least one of the TX processor 368, the RX processor 356, and the controller/processor 359. Alternatively, the processing system may be the entire UE (e.g., see 350 of FIG. 3). In one configuration, the apparatus for wireless communication includes means for performing any of the aspect of the method described in connection with FIG. 9 and the aspects performed by the UE 802 in FIG. 8. The aforementioned means may be one or more of the aforementioned components of the apparatus and/or the processing system of the apparatus configured to perform the functions recited by the aforementioned means. As described supra, the processing system may include the TX Processor 368, the RX Processor 356, and the controller/ processor 359. As such, in one configuration, the aforementioned means may be the TX Processor 368, the RX Processor 356, and the controller/processor 359 configured to perform the functions recited by the aforementioned means.

Figure 10:
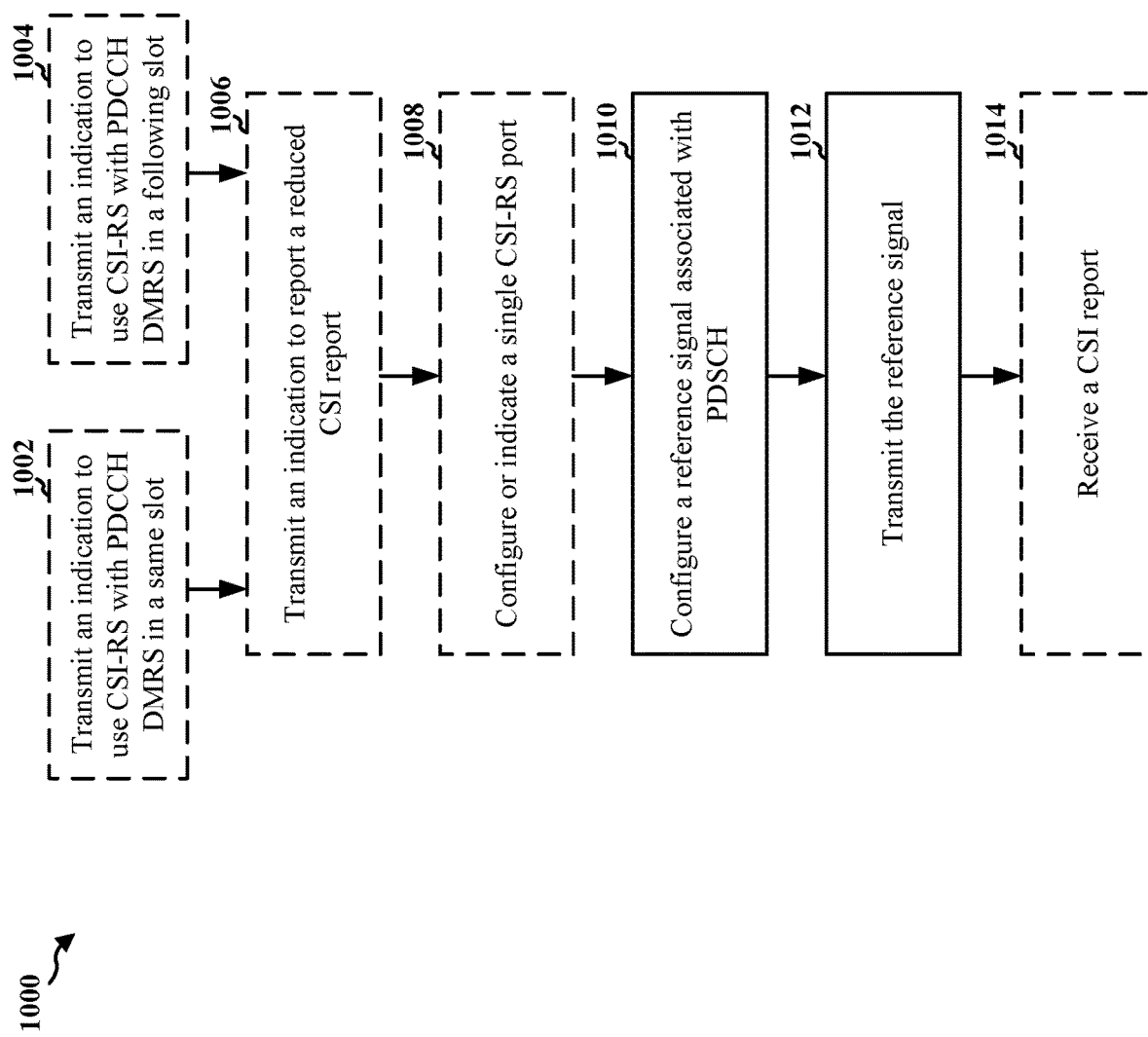
FIG. 10 is a flowchart of a method of wireless communication.

FIG. 10 is a flowchart 1000 of a method of wireless communication. The method may be performed by a base station or a component of a base station (e.g., the base station 102, 180, 310, 804; a processing system, which may include the memory 376 and which may be the entire base station 310 or a component of the base station 310, such as the TX Processor 316, the RX Processor 370, and the controller/processor 375). Optional aspects are illustrated with a dashed line. The method may improve PDCCH reception at a UE and/or transmission by a base station.

At 1010, the base station configures a reference signal associated with a PDSCH. The reference signal may comprise a CSI-RS, for example. The reference signal may be configured for at least one of transmission of a PDCCH or reception of a corresponding channel measurement for the PDCCH as feedback from a UE. Then at 1012, the base station transmits the reference signal to the UE. The CSI-RS may be transmitted based a pattern including a density in slots, such as described in connection with FIGS. 7A and 7B. In some examples, the CSI-RS may be present in a slot based on a number of symbols in which the PDCCH is transmitted in the slot, such as described in connection with FIGS. 7A and 7B. The CSI-RS may be based on a single port CSI-RS pattern for use with the PDCCH. The CSI-RS may be based on a single port CSI-RS for the PDSCH or one of multiple-ports for CSI-RS for the PDSCH.

As illustrated at 1014, when the CSI-RS is configured for the reception of the corresponding channel measurement for the PDCCH as the feedback from the UE, the base station may receive a CSI report from the UE based on the CSI-RS or the channel estimation for the PDCCH. The CSI report may comprise a reduced CSI report, e.g., including a CQI.

As illustrated at 1006, the base station may transmit an indication to the UE to report the reduced CSI report, where the CSI-RS measurements in the CSI report and reception of the reduced CSI report is based on the indication from the base station. The indication may be transmitted in DCI, a MAC-CE, and/or RRC message. The reduced CSI-RS report may be based on a configuration for PDSCH CSI-RS, e.g., not based on a configuration that is specific to use with the PDCCH. At 1006, the base station may transmit an indication to the UE to report the reduced CSI report, and the CSI-RS measurements may be based on a configuration for PDSCH CSI-RS, and the reduced CSI-RS report may be received in response to receiving the indication from the base station.

The base station may use the CSI report to transmit a PDCCH to the UE, e.g., as described in connection with any of FIGS. 5-8. The CSI-RS associated with the PDCCH may have the same precoding as the PDCCH, the same transmission power as DM-RS associated with the PDCCH, and/or a specific power difference from a transmission power of the DM-RS associated with the PDCCH. The specific power difference may be predefined or indicated in a DCI, a RRC message, or a MAC-CE. In some examples, the base station may transmit, e.g., at 1008, an indication of a single port CSI-RS configured for use with the PDCCH DMRS to perform the channel estimation. The indication may include a set of rules received in RRC signaling. The indication may be transmitted in DCI, an RRC message, or a MAC-CE.

As illustrated at 1008, the base station may transmit a configuration for a single port CSI-RS for cell specific transmission of the CSI-RS for at least one of the transmission of the PDCCH or the reception of the corresponding channel measurement. The single port may be a pure single port configuration for the CSI-RS or may be one port of a multiple port configuration for the CSI-RS. Alternately, at 1008, the base station may transmit an indication of an association between a single CSI-RS port and the PDCCH. Thus, an association may be established between the single CSI-RS port and the PDCCH. The indication may be transmitted in DCI, a MAC-CE, and/or RRC message. As illustrated at 1008, the base station may transmit an indication of the single port CSI-RS from a plurality of ports for PDSCH CSI-RS.

As illustrated at 1002, the base station may transmit an indication to use the single port CSI-RS with the PDCCH DMRS in a same slot to perform the channel estimation. As illustrated at 1004, the base station may transmit an indication to use the single port CSI-RS with the PDCCH DMRS in a following slot to perform the channel estimation.

An apparatus, which may be a base station or a component of a base station, may include components that perform each of the blocks of the algorithm in the aforementioned flowchart of FIG. 10, as well as any of the aspects performed by the base station 804 in FIG. 8. As such, each block in the aforementioned flowchart of FIG. 10, as well as any of the aspects performed by the base station 804 in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. The processing system may be a component of the base station 310 and may include the memory 376 and/or at least one of the TX Processor 316, the RX Processor 370, and the controller/processor 375. Alternatively, the processing system may be the entire base station (e.g., see 320 of FIG. 3). In one configuration, the apparatus for wireless communication includes means for performing any of the aspect of the method described in connection with FIG. 10 and the aspects performed by the base station 804 in FIG. 8. The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and may be combined with aspects of other embodiments or teaching described herein, without limitation.

Example 1 is a method of wireless communication at a user Equipment (UE), comprising: receiving a reference signal associated with a physical downlink shared channel (PDSCH); and using the reference signal to at least one of receive a physical downlink control channel (PDCCH) or measure the PDCCH and feedback a corresponding channel measurement for the PDCCH.

In Example 2, the method of Example 1 further includes that the reference signal comprises a channel state information reference signal (CSI-RS).

In Example 3, the method of Example 1 or 2 further includes receiving a configuration for a single port CSI-RS for cell specific transmission for the CSI-RS that the UE uses to at least one of receive the PDCCH or measure the PDCCH.

In Example 4, the method of any of Example 1-3 further includes receiving an indication of an association between a single CSI-RS port and the PDCCH.

In Example 5, the method of any of Example 1-4 further includes that the indication is received in at least one of downlink control information (DCI), a medium access control-control element (MAC-CE), or radio resource control (RRC) message.

In Example 6, the method of any of Example 1-5 further includes that the CSI-RS is associated with the PDCCH and has at least one of a same precoding as the PDCCH, a same transmission power as a demodulation reference signal (DM-RS) associated with the PDCCH, or a specific power difference from a transmission power of the DM-RS associated with the PDCCH. The specific power difference may be predefined or indicated in a DCI, a RRC message, or a MAC-CE.

In Example 7, the method of any of Example 1-6 further includes that the UE uses the CSI-RS together with a PDCCH demodulation reference signal (DMRS) to receive the PDCCH and perform channel estimation for the PDCCH.

In Example 8, the method of any of Example 1-7 further includes receiving an indication of a single port CSI-RS configured for use with the PDCCH DMRS to perform the channel estimation.

In Example 9, the method of any of Example 1-8 further includes that the indication comprises a set of rules received in radio resource control (RRC) signaling.

In Example 10, the method of any of Example 1-9 further includes that the indication is received in downlink control information (DCI), a radio resource control (RRC) message, or a medium access control-control element (MAC-CE).

In Example 11, the method of any of Example 1-10 further includes receiving an indication to use the CSI-RS with the PDCCH DMRS in a same slot to perform the channel estimation.

In Example 12, the method of any of Example 1-11 further includes receiving an indication to use the CSI-RS with the PDCCH DMRS in a following slot to perform the channel estimation.

In Example 13, the method of any of Example 1-12 further includes transmitting a channel state information (CSI) report to a base station based on a channel estimation for the PDCCH.

In Example 14, the method of any of Example 1-13 further includes transmitting a channel state information (CSI) report to a base station based on the CSI-RS.

In Example 15, the method of any of Example 1-14 further includes that the CSI report comprises a reduced CSI report including a channel quality indicator (CQI).

In Example 16, the method of any of Example 1-15 further includes receiving an indication from the base station to report the reduced CSI report, wherein the UE measures the CSI-RS and transmits the reduced CSI report based on the indication from the base station.

In Example 17, the method of any of Example 1-16 further includes that the indication is received in at least one of downlink control information (DCI), a medium access control-control element (MAC-CE), or radio resource control (RRC) message.

In Example 18, the method of any of Example 1-17 further includes that the UE measures the CSI-RS and transmits the reduced CSI report based on a configuration for PDSCH CSI-RS.

In Example 19, the method of any of Example 1-18 further includes receiving an indication from the base station to report the reduced CSI report, wherein the UE measures the CSI-RS based on a configuration for PDSCH CSI-RS and transmits the reduced CSI report in response to receiving the indication from the base station.

In Example 20, the method of any of Example 1-19 further includes that the CSI-RS is received based a pattern including a density in slots.

In Example 21, the method of any of Example 1-20 further includes that the CSI-RS is present in a slot based on a number of symbols in which the PDCCH is transmitted in the slot.

In Example 22, the method of any of Example 1-21 further includes that the CSI-RS is based on a single port CSI-RS pattern for use with the PDCCH.

In Example 23, the method of any of Example 1-22 further includes that the CSI-RS is based on a single port CSI-RS for the PDSCH.

In Example 24, the method of any of Example 1-23 further includes receiving an indication of the single port CSI-RS from a plurality of ports for PDSCH CSI-RS.

In Example 25, the method of any of Example 1-24 further includes that the reference signal is associated with the PDCCH based on at least one of: a configuration from a base station to operate in a mode in which the reference signal is associated with the PDCCH, a propagation level for the PDCCH, a type of the UE, or a capability of the UE.

Example 26 is a device including one or more processors and one or more memories in electronic communication with the one or more processors storing instructions executable by the one or more processors to cause the system or apparatus to implement a method as in any of Examples 1-25.

Example 27 is a system or apparatus including means for implementing a method or realizing an apparatus as in any of Examples 1-25.

Example 28 is a non-transitory computer readable medium storing instructions executable by one or more processors to cause the one or more processors to implement a method as in any of Examples 1-25.

Example 29 is a method of wireless communication at a base station, comprising: configuring a reference signal associated with a physical downlink shared channel (PDSCH) for at least one of: transmission of a physical downlink control channel (PDCCH), or reception of a corresponding channel measurement for the PDCCH as feedback from a user equipment (UE); and transmitting the reference signal to the UE.

In Example 30, the method of Example 29 further includes that the reference signal comprises a channel state information reference signal (CSI-RS).

In Example 31, the method of Example 29 or 30 further includes transmitting a configuration to the UE for a single port CSI-RS for cell specific transmission of the CSI-RS for at least one of the transmission of the PDCCH or the reception of the corresponding channel measurement.

In Example 32, the method of any of Example 29-31 further includes transmitting an indication of an association between a single CSI-RS port and the PDCCH.

In Example 33, the method of any of Example 29-32 further includes that the indication is transmitted in at least one of downlink control information (DCI), a medium access control-control element (MAC-CE), or radio resource control (RRC) message.

In Example 34, the method of any of Example 29-33 further includes that the CSI-RS is associated with the PDCCH and has at least one of a same precoding as the PDCCH, a same transmission power as demodulation reference signal (DM-RS) associated with the PDCCH, or a specific power difference from a transmission power of the DM-RS associated with the PDCCH. The specific power difference may be predefined or indicated in a DCI, a RRC message, or a MAC-CE.

In Example 35, the method of any of Example 29-34 further includes that the CSI-RS is configured for the transmission of the PDCCH together with a demodulation reference signal (DMRS) for the PDCCH for a channel estimation of the UE for the PDCCH.

In Example 36, the method of any of Example 29-35 further includes transmitting an indication of a single port CSI-RS configured for use with the PDCCH DMRS to perform the channel estimation.

In Example 37, the method of any of Example 29-36 further includes that the indication comprises a set of rules transmitted in radio resource control (RRC) signaling.

In Example 38, the method of any of Example 29-37 further includes that the indication is transmitted in downlink control information (DCI), a radio resource control (RRC) message, or a medium access control-control element (MAC-CE).

In Example 39, the method of any of Example 29-38 further includes transmitting an indication to use the CSI-RS with the PDCCH DMRS in a same slot to perform the channel estimation.

In Example 40, the method of any of Example 29-39 further includes transmitting an indication to use the CSI-RS with the PDCCH DMRS in a following slot to perform the channel estimation.

In Example 41, the method of any of Example 29-40 further includes receiving a

CSI report from the UE based on a channel estimation for the PDCCH or the CSI-RS, and that the CSI report comprises a reduced CSI report including a channel quality indicator (CQI).

In Example 42, the method of any of Example 29-41 further includes transmitting an indication to the UE to report the reduced CSI report, wherein the CSI report includes measurements based on the indication from the base station.

In Example 43, the method of any of Example 29-42 further includes that the indication is transmitted in at least one of downlink control information (DCI), a medium access control-control element (MAC-CE), or radio resource control (RRC) message.

In Example 44, the method of any of Example 29-43 further includes that the reduced CSI report is based on a configuration for PDSCH CSI-RS.

In Example 45, the method of any of Example 29-44 further includes transmitting an indication to the UE to report the reduced CSI report, wherein the CSI report includes measurements based on a configuration for PDSCH CSI-RS and the reduced CSI report is received in response to the indication from the base station.

In Example 46, the method of any of Example 29-45 further includes that the CSI-RS is transmitted based a pattern including a density in slots.

In Example 47, the method of any of Example 29-46 further includes that the CSI-RS is transmitted in a slot based on a number of symbols in which the PDCCH is transmitted in the slot.

In Example 48, the method of any of Example 29-47 further includes that the CSI-RS is based on a single port CSI-RS pattern for use with the PDCCH.

In Example 49, the method of any of Example 29-48 further includes that the CSI-RS is based on a single port CSI-RS for the PDSCH.

In Example 50, the method of any of Example 29-49 further includes transmitting an indication of the single port CSI-RS from a plurality of ports for PDSCH CSI-RS.

Example 51 is a device including one or more processors and one or more memories in electronic communication with the one or more processors storing instructions executable by the one or more processors to cause the system or apparatus to implement a method as in any of Examples 29-50.

Example 52 is a system or apparatus including means for implementing a method or realizing an apparatus as in any of Examples 29-50.

Example 53 is a non-transitory computer readable medium storing instructions executable by one or more processors to cause the one or more processors to implement a method as in any of Examples 29-50.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a channel state information (CSI) reference signal (CSI-RS) associated with a physical downlink shared channel (PDSCH); and
   using the CSI-RS associated with the PDSCH to at least one of:
      receive a physical downlink control channel (PDCCH) based on channel estimation information determined for the PDCCH using the CSI-RS associated with the PDSCH, or
      measure the PDCCH by performing channel estimation of the PDCCH using the CSI-RS associated with the PDSCH, and feedback a corresponding channel measurement for the PDCCH.

2. The method of claim 1, further comprising:
   receiving a configuration for a single port CSI-RS for cell specific transmission for the CSI-RS that the UE uses to at least one of receive the PDCCH or measure the PDCCH.

3. The method of claim 1, further comprising:
   receiving an indication of an association between a single CSI-RS port and the PDCCH.

4. The method of claim 3, wherein the indication is received in at least one of downlink control information (DCI), a medium access control-control element (MAC-CE), or radio resource control (RRC) message.

5. The method of claim 1, wherein the CSI-RS is associated with the PDCCH and has at least one of a same precoding as the PDCCH, a same transmission power as a demodulation reference signal (DM-RS) associated with the PDCCH, or a specific power difference from a transmission power of the DM-RS associated with the PDCCH.

6. The method of claim 5, wherein the specific power difference is predefined or indicated in a downlink control information (DCI), a radio resource control (RRC) message, or a medium access control-control element (MAC-CE).

7. The method of claim 1, wherein the UE uses the CSI-RS together with a PDCCH demodulation reference signal (DMRS) to receive the PDCCH and perform channel estimation for the PDCCH.

8. The method of claim 7, further comprising:
   receiving an indication of a single port CSI-RS configured for use with the PDCCH DMRS to perform the channel estimation.

9. The method of claim 8, wherein the indication comprises a set of rules received in radio resource control (RRC) signaling.

10. The method of claim 8, wherein the indication is received in downlink control information (DCI), a radio resource control (RRC) message, or a medium access control-control element (MAC-CE).

11. The method of claim 7, further comprising:
    receiving an indication to use the CSI-RS with the PDCCH DMRS in a same slot to perform the channel estimation.

12. The method of claim 7, further comprising:
    receiving an indication to use the CSI-RS with the PDCCH DMRS in a following slot to perform the channel estimation.

13. The method of claim 1, wherein the UE uses the CSI-RS to measure the PDCCH.

14. The method of claim 13, further comprising:
    transmitting a channel state information (CSI) report to a base station based on a channel estimation for the PDCCH.

15. The method of claim 13, further comprising:
    transmitting a channel state information (CSI) report to a base station based on the CSI-RS.

16. The method of claim 15, wherein the CSI report comprises a reduced CSI report including a channel quality indicator (CQI).

17. The method of claim 16, further comprising:
    receiving an indication from the base station to report the reduced CSI report, wherein the UE measures the CSI-RS and transmits the reduced CSI report based on the indication from the base station.

18. The method of claim 17, wherein the indication is received in at least one of downlink control information (DCI), a medium access control-control element (MAC-CE), or radio resource control (RRC) message.

19. The method of claim 16, wherein the UE measures the CSI-RS and transmits the reduced CSI report based on a configuration for PDSCH CSI-RS.

20. The method of claim 16, further comprising:
    receiving an indication from the base station to report the reduced CSI report, wherein the UE measures the CSI-RS based on a configuration for PDSCH CSI-RS and transmits the reduced CSI report in response to receiving the indication from the base station.

21. The method of claim 1, wherein the CSI-RS is received based a pattern including a density in slots.

22. The method of claim 1, wherein the CSI-RS is present in a slot based on a number of symbols in which the PDCCH is transmitted in the slot.

23. The method of claim 1, wherein the CSI-RS is based on a single port CSI-RS pattern for use with the PDCCH.

24. The method of claim 1, wherein the CSI-RS is based on a single port CSI-RS for the PDSCH.

25. The method of claim 24, further comprising:
    receiving an indication of the single port CSI-RS from a plurality of ports for PDSCH CSI-RS.

26. The method of claim 1, wherein the CSI-RS is associated with the PDCCH based on at least one of:
    a configuration from a base station to operate in a mode in which the CSI-RS is associated with the PDCCH,
    a propagation level for the PDCCH,
    a type of the UE, or
    a capability of the UE.

27. A method of wireless communication at a base station, comprising:
    configuring a channel state information (CSI) reference signal (CSI-RS) associated with a physical downlink shared channel (PDSCH) for at least one of:
       transmission of a physical downlink control channel (PDCCH), or
       reception of a corresponding channel measurement for the PDCCH as feedback from a user equipment (UE), wherein the channel measurement for the PDCCH is based on the CSI-RS associated with the PDSCH; and
    transmitting the CSI-RS to the UE.

28. The method of claim 27, further comprising:
transmitting a configuration to the UE for a single port CSI-RS for cell specific transmission of the CSI-RS for at least one of the transmission of the PDCCH or the reception of the corresponding channel measurement.

* * * * *